(12) United States Patent
McIlroy

(10) Patent No.: US 11,347,692 B1
(45) Date of Patent: May 31, 2022

(54) ZERO BLOCK ELIMINATION REPORTING FOR A FILE SYSTEM

(71) Applicant: EMC IP Holding Company LLC, Hopkinton, MA (US)

(72) Inventor: Lachlan McIlroy, McIlroy (AU)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 20 days.

(21) Appl. No.: 17/151,833

(22) Filed: Jan. 19, 2021

(51) Int. Cl.
*G06F 16/174* (2019.01)
*G06F 16/11* (2019.01)

(52) U.S. Cl.
CPC ........ *G06F 16/1752* (2019.01); *G06F 16/116* (2019.01)

(58) Field of Classification Search
CPC ........................... G06F 16/1752; G06F 16/116
See application file for complete search history.

(56) References Cited

U.S. PATENT DOCUMENTS

| | | | | |
|---|---|---|---|---|
| 7,356,679 B1* | 4/2008 | Le | ........................... | G06F 16/10 713/1 |
| 7,908,285 B2* | 3/2011 | Dorsett, Jr. | ........... | G06F 16/289 707/756 |
| 9,589,038 B1* | 3/2017 | Miller | .................... | G06F 16/254 |
| 10,496,611 B1* | 12/2019 | Singh | ...................... | G06F 16/11 |
| 2022/0058161 A1* | 2/2022 | Wang | .................... | G06F 16/188 |

OTHER PUBLICATIONS

"Next Generation Storage Efficiency With Isilon All-Flash and In-Line Data Reduction," Dell EMC White Paper, Aug. 2019, 36 pages.
"Next Generation Storage Efficiency With Dell EMC Powerscale In-Line Data Reduction," Dell Technologies White Paper, https://www.delltechnologies.com/en-ca/collaterals/unauth/white-papers/products/storage/h17549_wp_isilon_filesystem_compression.pdf, Apr. 2021, accessed May 14, 2021, 44 pages.
"Dell EMC Powerscale Onefs: A Technical Overview," Dell Technologies White Paper, https://www.delltechnologies.com/en-us/collaterals/unauth/technical-guides-support-information/products/storage/h10719-isilon-onefs-technical-overview-wp.pdf, Apr. 2021, accessed May 14, 2021, 43 pages.

* cited by examiner

*Primary Examiner* — James Trujillo
*Assistant Examiner* — Michal Bogacki
(74) *Attorney, Agent, or Firm* — Amin, Turocy & Watson, LLP

(57) ABSTRACT

Zero block elimination (ZBE) and statistical accounting for reduction in storage space used in a memory component of a file system due to ZBE can be managed. During a write operation, in response to eliminating a zero block from the write operation, a data management component (DMC) can associate a zero extent with a sparse region that represents a block in the memory component where the zero block was to have been written, unless a zero extent is already associated with that block. DMC can determine a number of zero blocks eliminated from write operations due to ZBE based on the number of zero extents associated with files stored in the memory component, to facilitate determining an amount of reduction of use of storage space in the memory component, or a data reduction ratio, storage efficiency ratio, or zero reduction ratio associated with the memory component, due to ZBE.

20 Claims, 10 Drawing Sheets

ZERO BLOCK ELIMINATION REPORTING FOR A FILE SYSTEM

TECHNICAL FIELD

This disclosure relates generally to processing data, e.g., zero block elimination reporting for a file system.

BACKGROUND

A file system typically can be employed to maintain files (e.g., electronic files), comprising data (e.g., electronic or digital data), including keeping track of the locations of files and associated data in memory to enable accessing of the files stored in, and retrieval of the files from, the memory. The files, including data associated with the files, often can be processed in a number of ways when data is being written to or read from files and when the files are being stored in, or retrieved from, the memory.

The above-described description is merely intended to provide a contextual overview regarding file systems and processing data, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise: during a write operation, in response to removing a chunk of data, which is determined to contain data bits having zero values, from the write operation, associating, by a system comprising a processor, a zero extent with a sparse region that can represent the chunk of data. The method further can comprise determining, by the system, a first number of chunks of data that have been removed from write operations due to zero data chunk removal based at least in part on a second number of zero extents, comprising the zero extent, determined to be in extent maps associated with a group of files stored in a memory component, to facilitate determining an amount of reduction of use of physical storage space in the memory component due to the zero data chunk removal.

In certain embodiments, the disclosed subject matter can comprise a system that can include a memory that stores computer executable components, and a processor that executes computer executable components stored in the memory. The computer executable components can comprise a write component that can initiate execution of a write operation to write blocks of data to a memory component, wherein the blocks of data can comprise a block of data. The computer executable components also can include a data management component that, during the write operation, can associate a zero extent with a sparse region that can represent the block of data, in response to elimination of the block of data from the write operation due to the block of data being determined to comprise data bits having zero values. The data management component can determine a first number of blocks of data that have been eliminated from write operations due to zero block elimination based at least in part on a second number of zero extents, comprising the zero extent, associated with a group of files stored in the memory component, to facilitate determining an amount of reduction of use of storage space in the memory component resulting from the zero block elimination.

In still other embodiments, a non-transitory machine-readable medium, comprising executable instructions that, when executed by a processor, facilitate performance of operations. The operations can comprise: during a write operation, in response to eliminating a chunk of data, which is determined to contain data bits having zero values, from the write operation, linking a zero reference with a sparse region that can represent the chunk of data. The operations also can comprise determining a first number of chunks of data that have been eliminated from write operations due to zero data chunk removal based at least in part on a second number of zero references, comprising the zero reference, associated with a set of files stored in a memory component, to facilitate determining an amount of reduction of use of storage space in the memory component due to the zero data chunk elimination, wherein the write operations can comprise the write operation, and wherein the chunks of data can comprise the chunk of data.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
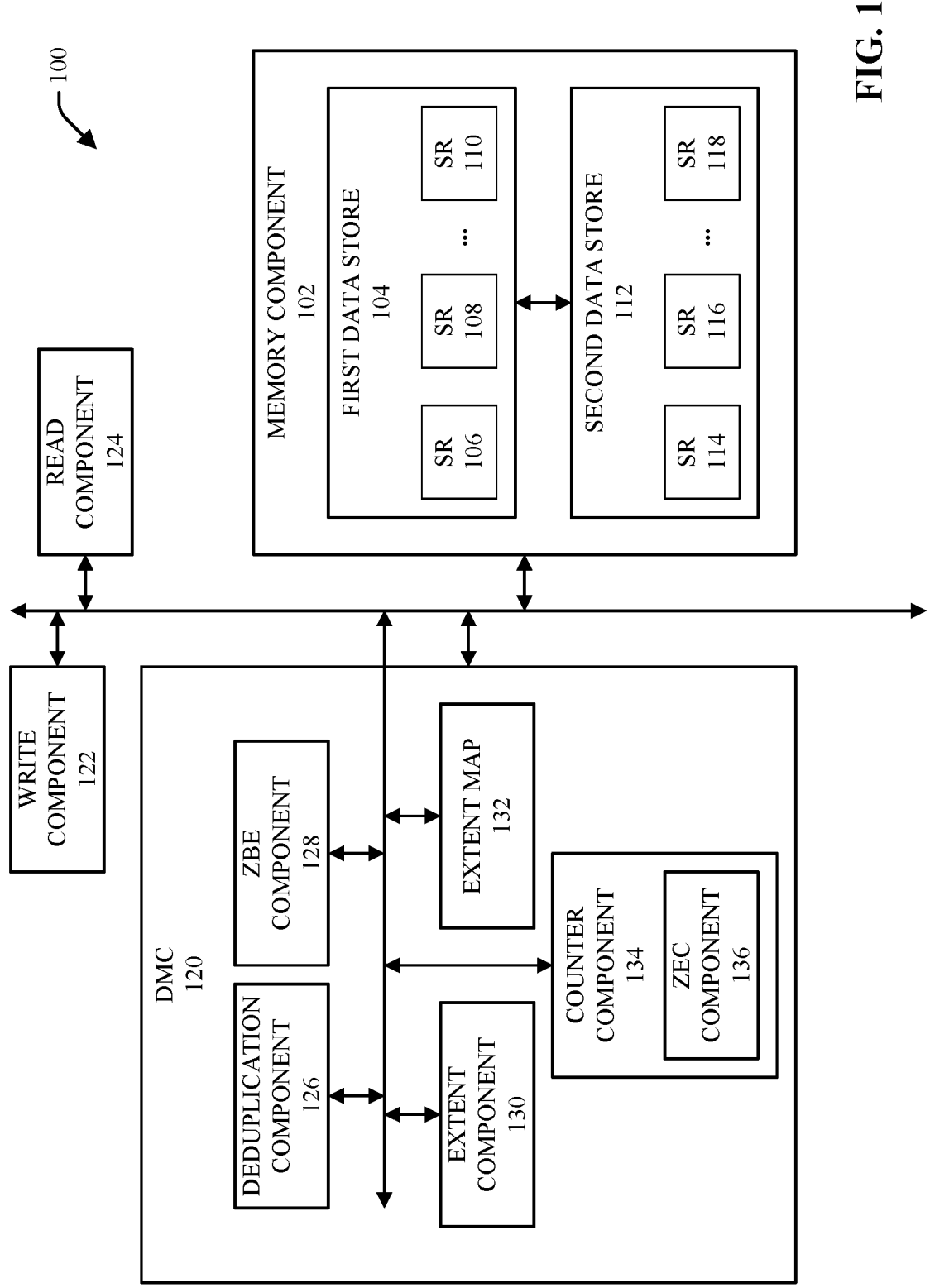
FIG. 1 illustrates a block diagram of an example system that can desirably manage performing zero block elimination (ZBE), including accounting for reduction in utilization of storage space of a memory component resulting from performing zero block elimination, and other data processing associated with a file system, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A file system typically can be employed to maintain files (e.g., electronic files), comprising data (e.g., electronic or digital data), including keeping track of the locations of files and associated data in a memory component (e.g., data store in a memory component) to enable accessing of the files stored in, and retrieval of the files from, the memory component. The files, including data associated with the files, often can be processed in a number of ways when data is being written to or read from files and when the files are being stored in, or retrieved from, the memory component.

Sometimes when blocks of data are being written to and/or stored in the memory component, some of the blocks of data can contain only zero values (e.g., can be a zero block). It can be undesirable to utilize storage space (e.g., physical storage locations or space) merely to store zero blocks in the data store. The disclosed subject matter can perform zero block elimination (ZBE) to eliminate zero blocks from a write operation and replace the eliminated zero blocks with corresponding sparse regions that can be stored in metadata associated with the file(s) to which the eliminated zero blocks were to have been written. ZBE can thereby desirably reduce the amount of storage space utilized in the memory component.

With regard to the efficiency of storage of data in the memory component, it can be desirable to generate statistics relating to such efficiency of data storage in the memory component. Certain traditional efficiency statistics, such as a traditional storage efficiency ratio or a traditional data reduction efficiency ratio, can indicate respective aspects of the efficiency of a traditional file system in managing storage of data in a memory component, including reducing the usage of storage space in the memory component, based on the logical data (e.g., logical blocks of data) written to the memory component divided by the physical storage space utilized in the memory component to store the data (e.g., blocks of data) written to the memory component.

As indicated, ZBE can desirably reduce the amount of storage space utilized in the memory component. However, an issue (e.g., problem, drawback, or deficiency) in determining traditional efficiency statistics can be that, when ZBE eliminates zero blocks from write operations, the zero blocks are not included in the logical data written to the memory component. Since traditional efficiency statistics, including the traditional storage efficiency ratio and the traditional data reduction efficiency ratio, can be calculated based on the logical data written to the memory component divided by the physical storage space utilized in the memory component to store the data written to the memory component, and the eliminated zero blocks are not included in the logical data, the storage savings and efficiency due to ZBE is not accounted for in the traditional efficiency statistics.

Another issue in determining traditional efficiency statistics can be that, traditionally, multiple write operations to write data (e.g., zero blocks) to the same storage region (e.g., storage block) in the memory component may be counted multiple times even though only that single storage region was saved. As a result, in traditional file systems, even if savings in storage space due to ZBE were to be included in the traditional efficiency statistics, there potentially can be a problem of an overcount (e.g., multiple or double count) in storage space savings, if, as part of multiple write operations, multiple writes of zero data to a same storage region (e.g., same block) in the memory component are eliminated from the write operations due to ZBE, with each ZBE associated with the same storage region being counted as a storage space savings, and such overcount problem can undesirably skew, and render inaccurate, traditional efficiency statistics for the memory component.

To that end, techniques for desirably (e.g., efficiently) implementing and managing ZBE and statistical accounting for reduction in storage space utilized in a memory component of a file system due to ZBE are presented. The disclosed subject matter can comprise a data management component (DMC) that can manage operations associated with performing ZBE and determining (e.g., calculating) efficiency statistics that can desirably account for reduction in the amount of storage space utilized in the memory component of the file system due to performing ZBE as well as other types of data storage efficiency operations. During a write operation, in response to eliminating a zero block (e.g., a block of data having data bits that are all zero values) from the write operation, the DMC can associate (e.g., link or map) a zero extent with a sparse region that can represent a storage region (e.g., block) in the memory component where the zero block was to have been written, unless the DMC determines that a zero extent is already associated with that storage region. If the DMC creates a new zero extent and associates it with the sparse region, the DMC can increment (e.g., increment or increase by one) a zero extent counter that can maintain a count of the number of zero extents associated with files stored in the memory component. If the DMC determines that a zero extent is already associated with that storage region, the DMC can determine that no new zero extent is to be created with respect to that storage region, and can determine that the zero extent counter is not to be incremented or changed.

In accordance with various embodiments, the DMC can determine a number of zero blocks that have been eliminated from write operations due to ZBE based at least in part on the number of zero extents associated with files stored in the memory component (e.g., as indicated by the zero extent counter), to facilitate determining an amount of reduction of use of storage space in the memory component, and/or a data reduction ratio, a storage efficiency ratio, or a zero reduction ratio associated with the memory component, due to ZBE.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) manage performing zero block elimination, including accounting for reduction in utilization of storage space of a memory component resulting from performing zero block elimination, and other data processing associated with a file system, in accordance with various aspects and embodiments of the disclosed subject matter. The system 100 can be or can comprise a file system that can be employed to manage files and data associated with files. The system 100 can be part of and/or employed with or by a node (e.g., Mode) or set (e.g., group or cluster) of nodes that can store, and manage the storage of, data. The system 100 can comprise a memory component 102 that can comprise a desired number of storage regions (e.g., storage locations or storage blocks) for storage of data written to the memory component 102. The memory component can comprise a first data store 104 that can include a first set of storage regions, such as, for example, storage regions (SRs) 106, 108, and 110, wherein data can be stored. For instance, files (e.g., native files) can be stored in the first data store 104, wherein respective data of the respective files can be stored in respective storage regions (e.g., 106, 108, and/or 110) of the first set of storage regions in the first data store 104.

In some embodiments, the memory component 102 also can comprise a second data store 112 (e.g., a shadow data store) that can include a second set of storage regions, such as, for example, storage regions 114, 116, and 118, wherein data can be stored. The second data store 112 can be associated with the first data store 104. In some embodiments, the file system of the system 100 can be structured or configured such that the first data store 104 and files stored therein can be available and/or visible in the file directory to users, and the second data store 112 can be latent (e.g., hidden or not visible) and not accessible (e.g., not directly accessible) to users via the file directory (e.g., the second data store 112 and the data stored therein does not appear in the file directory of the file system).

The system 100 can include a DMC 120 that can manage data and operations associated with the system 100, including controlling write operations, read operations, data deduplication operations, comprising inline data deduplication operations and post-process data deduplication operations, zero block elimination (ZBE) operations, statistics operations, and/or other operations of the system 100, as more fully described herein. The DMC 120 can be associated with (e.g., communicatively connected to) the memory component 102 and other components of the system 100 via a bus system or other communication connections.

The system 100 also can comprise a write component 122 that can be employed to perform write operations to write data to the memory component 102, and a read component 124 that can be utilized to perform read operations to read data from the memory component 102, as managed by the DMC 120. During write operations, the DMC 120 can determine whether ZBE (e g, inline ZBE), inline data deduplication, post-process (e.g., asynchronous post-process) data deduplication, or no data deduplication is to be performed with regard to blocks of data being written to the memory component 102. During read operations, the DMC 120 can determine whether post-process data deduplication or no data deduplication is to be performed with regard to blocks of data that are read from the memory component 102. The DMC 120 can comprise a deduplication component 126 that can perform or facilitate performing inline or post-process data deduplication operations on blocks of data, as determined and managed by the DMC 120. The DMC 120 also can comprise a ZBE component 128 that can perform a ZBE process (e.g., a zero block or chunk removal process) to determine whether any of the blocks of data contain only zero values and to remove (e.g., eliminate) any block of data from a write operation that is determined to contain only zero values, as determined and managed by the DMC 120. The DMC 120 also can perform other types of data processes, such as, for example, data compression processes, that can desirably reduce the amount of storage space utilized in the memory component 102 and/or enhance the storage efficiency of the memory component 102.

For instance, during a write operation to write data to the memory component 102 or with regard to data already stored in the memory component 102, the deduplication component 126 can analyze the data to facilitate determining whether data deduplication (e.g., inline deduplication process or post-process deduplication) is to be performed. In certain embodiments, if and when, based at least in part on the results of such analysis, the deduplication component 126 determines that a same block (e.g., chunk or subset) of data appears in multiple storage locations in one or more files in the first data store 104 or will appear in multiple storage locations in one or more files in the first data store 104 upon execution of a write operation in progress, the deduplication component 126 can perform a data deduplication process (e.g., inline deduplication process or post-process deduplication) to store the block of data in a storage region (e.g., 114) in the second data store 112 and remove (e.g., delete or eliminate) the block of data from the multiple storage regions in the one or more files in the first data store 104. In such instance, the deduplication component 126 can insert second data store (SDS) reference values (e.g., shadow store reference values) into the one or more files in the first data store 104 (e.g., into the respective metadata of the one or more files), wherein the SDS reference values in the one or more files can reference the storage location (e.g., 114) where the block of data is stored in the second data store 112. The SDS reference values can be located in the respective logical locations in the respective metadata that can correspond to the respective locations of the block of data in the one or more files. This data deduplication process is one of a number of types of data reduction and/or storage efficiency processes that can be performed by the file system (e.g., as managed by the DMC 120) to facilitate reducing the amount of storage space (e.g., physical storage regions or blocks) utilized by the file system to store the data in the memory component 102.

Figure 2:
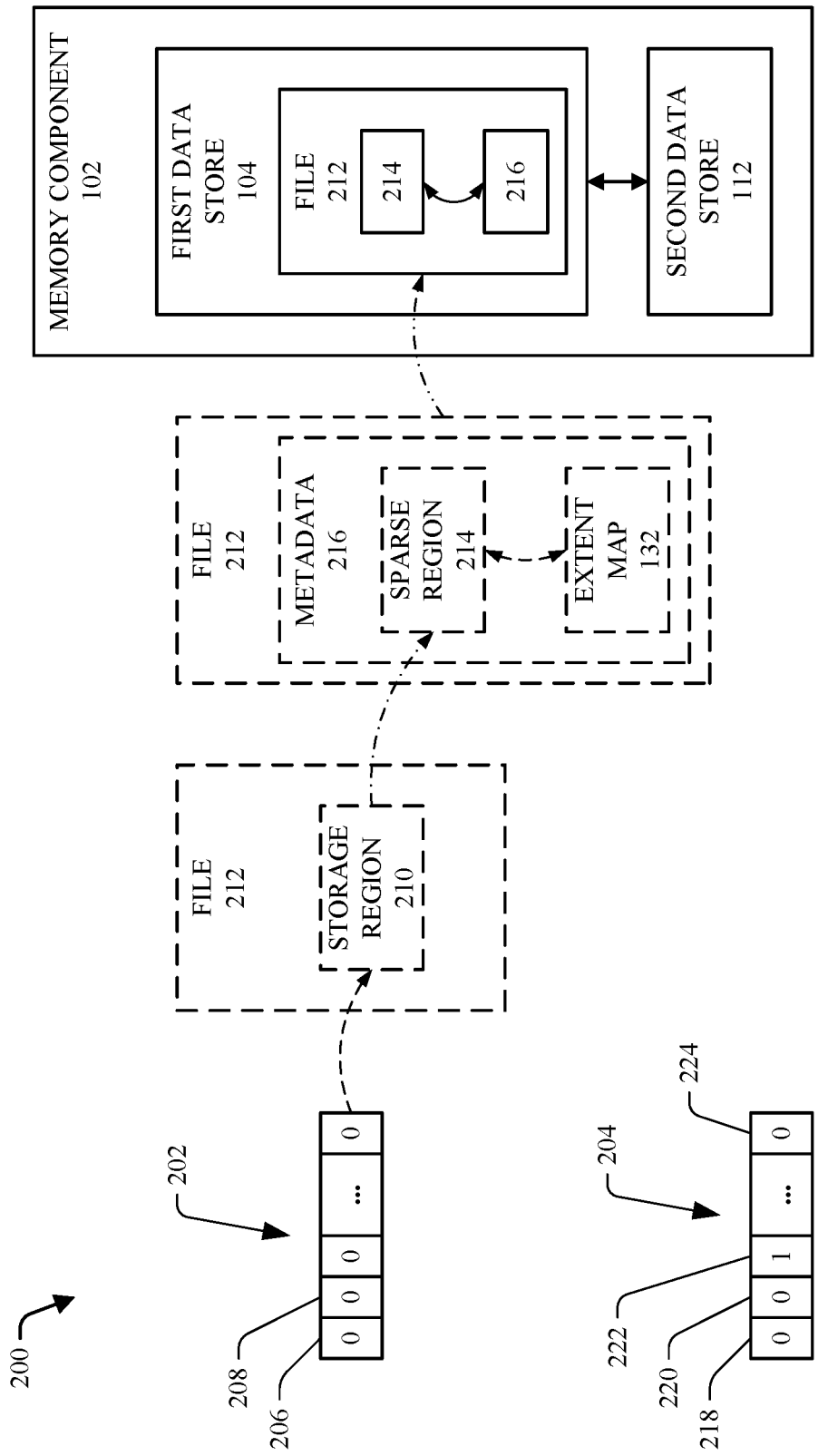
FIG. 2 depicts a block diagram of an example ZBE process that can be employed to remove blocks of data containing only zero values in connection with a write operation, in accordance with various aspects and embodiments of the disclosed subject matter.

In some embodiments, during a write operation, prior to determining whether to perform, or performing, data deduplication, the DMC 120, employing the ZBE component 128, can perform a ZBE process (e.g., an inline ZBE process) to determine whether any blocks of data being written to the memory component 102 contain only zero values (e.g., contain data bits that all have zero values) and to remove any blocks of data that are determined to contain only zero values from the write operation. In that regard, referring to FIG. 2 (along with FIG. 1), FIG. 2 depicts a block diagram of an example ZBE process 200 that can be employed to remove blocks of data containing only zero values in connection with a write operation, in accordance with various aspects and embodiments of the disclosed subject matter. In some embodiments, during a write operation, the DMC 120 can receive the data being written to the memory component 102, and can segment (e.g., divide or partition) the data into block (e.g., chunks or segments) of data. The ZBE component 128 can perform the ZBE process to remove any chunk of data (if any) from the write operation that is determined to contain only zero values.

For instance, the ZBE component 128 can analyze the blocks of data of the write operation to determine whether any of the blocks of data, such as, for example, block of data 202 or block of data 204, of the write operation contain only zero values. Based at least in part on the analysis of the blocks of data, the ZBE component 128 can determine whether any of the blocks of data contain only zero values. In response to determining that a block of data contains only zero values, the ZBE component 128 can remove such block of data from the write operation to prevent that block of data from being written to the first data store 104 (e.g., to the file in the first data store) or the second data store 112, and can convert the storage region where the block of data would have been stored in the file in the first data store 104 to a sparse region that can be stored in the metadata associated with the file.

As an example, based at least in part on the analysis of the block of data 202, the ZBE component 128 can determine that all of the bits (e.g., bit 206, bit 208, or other bit(s)) of the block of data 202 contain zero values. In response to determining that the block of data 202 contains only zero values, the ZBE component 128 can remove the block of data 202 from the write operation to prevent that block of data 202 from being written to a storage region 210 (e.g., block or storage location) associated with a file 212 in the first data store 104 (or to the second data store 112), can convert the storage region 210 where the block of data 202 would have been stored in the file 212 in the first data store 104 to a sparse region 214 in the metadata associated with the file, and can generate or update metadata 216 in the file 212 to reflect or represent the removal of the block of data 202 from the write operation and to reflect or represent the sparse region 214 associated therewith, wherein the metadata 216 can be associated with the sparse region 214 and the storage region 210. For example, the metadata 216 can reference the block of data 202 and indicate that the block of data 202 contained only zero values, can indicate that the storage region 210 has been converted to be or comprise the sparse region 214, and/or can indicate the location of the storage region 210 or sparse region 214 in the file 212. When data is being read the file 212 (e.g., during a read operation performed by the read component 124), the sparse region 214 relating to or representing that zero block (e.g., block of data 202) can be read and/or identified in the metadata 216 of the file 212, and based at least in part on the reading and/or identifying of the sparse region relating to or representing that zero block 214 in the metadata 216, the read component 124 can generate a block of data containing all zero values in the desired (e.g., proper or suitable) location in the file 212 (e.g., the same location where block of data 202 would have been in the file 212 if it had not be eliminated from the write operation as a result of the ZBE process).

In some embodiments, with regard to the ZBE process or data deduplication process, the DMC 120 can punch blocks in files to facilitate creating sparse regions in the files. The DMC 120 can add any block(s) of data being eliminated from a write operation due to the ZBE process or data deduplication process to a punch block mask, which can be passed to the write engine. If there is a block(s) of data being converted to a shadow reference(s), the punch block mask can include the block(s) of data being converted to a shadow reference(s). For instance, the DMC 120 can punch a block in a file, wherein punching the block can be the process of converting a block within the file to a sparse region. Such punching of the block can be performed when the current extent for the block is not already sparse, and it does not have to be performed with regard to a region of the block that already is sparse. The DMC 120 can utilize this punching block operation to punch a block in a file when a block full of zero values is being written to the memory component 102 or when, with regard to a data deduplication process, the DMC 120 intends to insert an SDS reference value (e.g., a shadow reference) at the location of the block.

As another example, based at least in part on the analysis of the block of data 204, the ZBE component 128 can determine that bit 218 and bit 220 of the block of data 204 contain zero values and also can determine that bit 222 of the block of data 204 does not contain a zero value (e.g., contains a one value). In response to determining that bit 222 contains a non-zero value, the ZBE component 128 can determine that the block of data 204 does not contain only zero values and can terminate (e.g., abort) further analysis of the block of data 204 with regard to the ZBE process 200 without further analyzing the remaining bits (e.g., bit 224) of the block of data 204, since further analysis of the block of data 204 can be undesired (e.g., unnecessary and inefficient) due to it already being determined that the block of data 204 contains a bit (e.g., bit 222) that contains a non-zero value. As a result, the ZBE component 128 can determine that the block of data 204 is not to be removed from the write operation, in accordance with the ZBE process 200. As another result, the DMC 120 can perform further analysis of the block of data 204 to determine whether an inline or post-process data deduplication process is to be performed on the block of data 204, such as more fully described herein. As a further result, the amount of overhead (e.g., processing (e.g., computing) and time resource usage) associated with the ZBE process 200 can be mitigated (e.g., reduced or minimized), since the ZBE process 200 can be terminated upon a first occurrence upon identifying a non-zero value in a block of data (e.g., block of data 204).

The ZBE process 200 can mitigate (e.g., reduce or minimize) undesired (e.g., unnecessary) writing of data chunks containing only zero values to the memory component 102, can mitigate undesired wear on the memory component 102 due to undesired writing of such zero blocks, can mitigate the amount of storage space that is utilized to store data in the memory component 102, and/or can mitigate the amount of resources (e.g., processing resources, time resources, . . . ) utilized to process (e.g., write, read, maintain, . . . ) data associated with the memory component 102. As a result, the ZBE process 200 can enhance (e.g., improve, increase, or optimize) the data reduction efficiency, storage efficiency, resource usage efficiency, or other type of efficiency of the file system and associated memory component 102.

As more fully described herein though, when determining efficiency statistics, such as the data reduction ratio, storage efficiency ratio, or other type of efficiency statistic associated with a file system and associated memory component, a traditional file system does not reflect or account for any reduction in usage of storage blocks in the memory component due to the elimination of zero blocks from write operations. The disclosed subject matter can overcome these and other deficiencies associated with traditional file systems by employing techniques and processes that can desirably (e.g., suitably, acceptably, accurately, or optimally) account for the reduction in usage of storage regions (e.g., storage blocks) in the memory component 102 due to the elimination of zero blocks from write operations as a result of the performance of the ZBE process 200.

In accordance with various embodiments, the DMC 120 can comprise an extent component 130 that can utilize zero extents (also referred to as ADDR_ZERO extents, zero references, zero symbols, or delta attributes), and can manage the use of zero extents, with regard to the elimination of zero blocks from write operations to facilitate desirably (e.g., suitably, acceptably, accurately, or optimally) accounting for the reduction in usage of storage regions in the memory component 102 due to the elimination of zero blocks from write operations as a result of performance of the ZBE process 200, in accordance with the defined data management criteria. An extent can be a contiguous area of storage for a file in a file system. A zero extent can be a particular type of extent that can indicate that a particular sparse region in metadata of a file was converted to a sparse region as a result of elimination of a zero block (e.g., block of data containing all zero values for all of its bits) from a write operation. In some embodiments, application programming interfaces (APIs) can be provided and utilized to support ZBE operations, including the utilizing and counting of zero extents (e.g., delta attributes), as well as node (e.g., Mode) accessors and mutators.

In accordance with various embodiments, the extent component 130 also can employ other types of extents, such as, for example, a sparse extent (also referred to as ADDR_SPARSE extent, sparse reference, or sparse symbol), a shadow extent (also referred to as ADDR_SHADOW extent, shadow reference, or shadow symbol), a block extent (also referred to as ADDR_BLOCK extent, block reference, or block symbol), or other desired type of extent. The sparse extent can be a type of extent that can relate to a sparse region that was created for a reason (e.g., data deduplication) other than the elimination of a zero block from a write operation. The zero extent and sparse extent can be similar, in that they both can be associated with sparse regions, however, the zero extent particularly relates to a sparse region created as a result of the elimination of a zero block from a write operation. In certain embodiments, zero extents in a block or extent map (e.g., associated with a file) can be tagged (e.g., differently tagged) to differentiate zero extents from sparse extents. A shadow extent can relate to or be associated with a storage region, and/or associated data stored in the storage region, in the second data store 112 (e.g., shadow data store). A block extent can relate to or be associated with a storage region, and/or associated data stored in the storage region, in the first data store 104 (e.g., primary data store). In some embodiments, certain extents, such as zero extents and sparse extents, of a file (e.g., file 212) are not included in the logical size of the file.

The extent component 130 can generate, maintain, and/or manage the various respective types of extents and extent maps that can comprise the respective types of extents and other metadata to facilitate identifying data and/or identifying locations of data (e.g., logical or physical locations of data) in the memory component 102. Each file (e.g., file 212) can be associated with an extent map (e.g., extent map 132) that can be stored in the metadata (e.g., metadata 216) that can be associated with the file. In some embodiments, an extent map (e.g., extent map 132) can be stored in a block (e.g., disk block) of or associated with the file (e.g., file 212).

Figure 3:
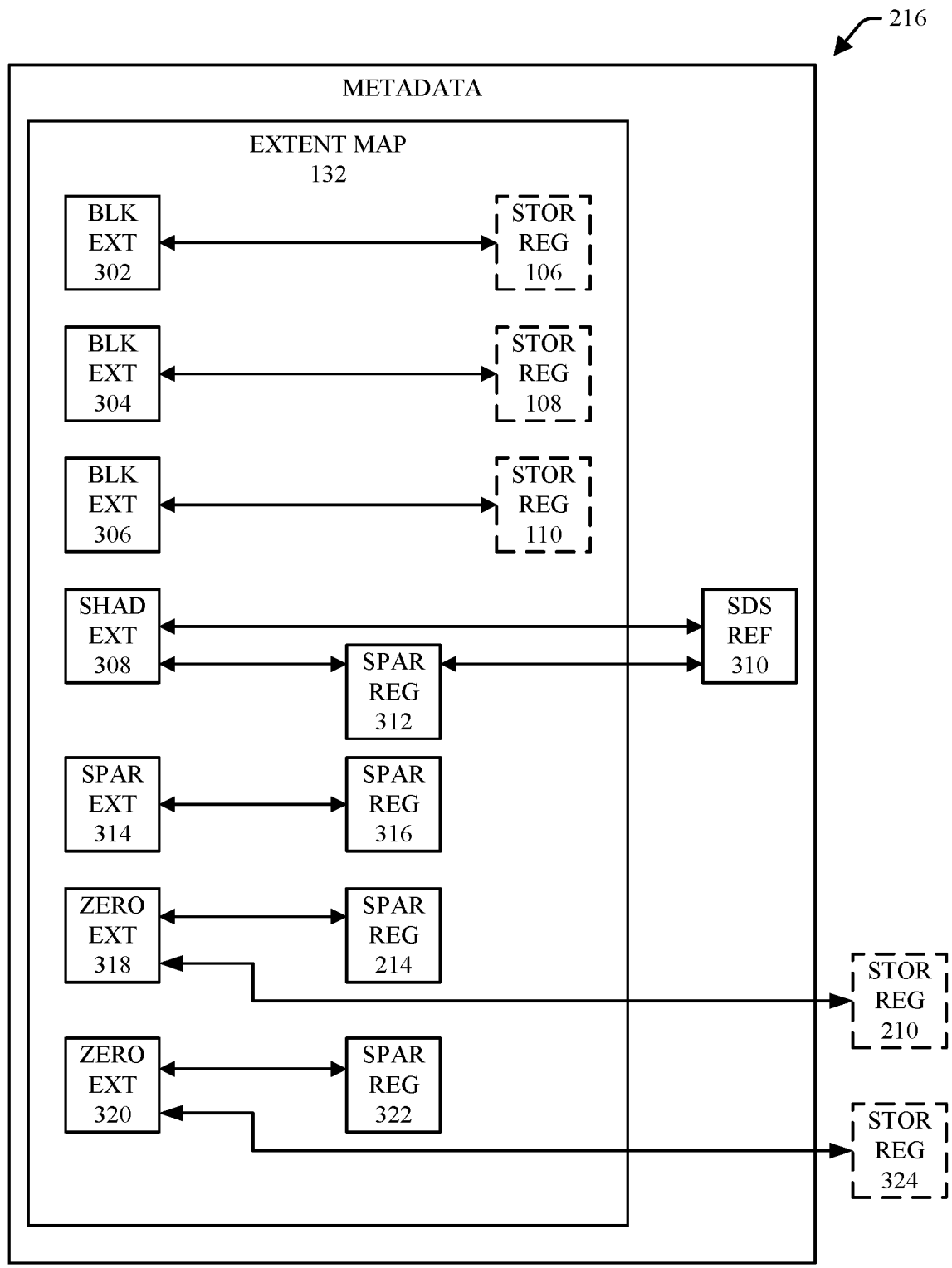
FIG. 3 illustrates a block diagram of example metadata comprising an extent map associated with an example file, wherein the extent map can comprise zero extents relating to zero blocks eliminated from write operations, in accordance with various aspects and embodiments of the disclosed subject matter.

Turning to FIG. 3 (along with FIGS. 1 and 2), FIG. 3 illustrates a block diagram of example metadata 216 comprising the extent map 132 associated with an example file 212, wherein the extent map 132 can comprise zero extents relating to zero blocks eliminated from write operations, in accordance with various aspects and embodiments of the disclosed subject matter. The extent component 130 can generate and manage the extent map 132 associated with the file 212, and can generate and manage other extent maps associated with other files stored in the memory component 102. Each extent map, including the extent map 132, can comprise various entries (e.g., map entries), such as various types of extents and other metadata, relating to various items of data (e.g., blocks of data) that can be contained in the associated file (e.g., file 212).

The extent component 130 can generate block extents (BLK EXT), such as block extent 302, block extent 304, and block extent 306, and can insert those block extents (e.g., 302, 304, 306) in respective locations (e.g., regions) of the extent map 132 that can correspond to, can be mapped or linked to, or otherwise can be associated with the physical storage regions (STOR REG) (e.g., 106, 108, and 110) in the file 212 in the first data store 104 where respective blocks of data can be stored. The actual physical storage regions (e.g., 106, 108, and 110) are not stored in the extent map 132, but rather information indicating or identifying the physical storage regions and the mapping between the block extents (e.g., 302, 304, 306) and the physical storage regions (e.g., 106, 108, and 110) are stored in the extent map 132. The extent component 130 also can generate shadow extents (SHAD EXT) (e.g., secondary extents), such as shadow extent 308, and can insert the shadow extents (e.g., 308) in respective locations (e.g., regions) of the extent map 132 that can correspond to, can be mapped or linked to, or otherwise can be associated with the physical storage regions (e.g., 114) in the second data store 112 where respective blocks of data can be stored, and/or can correspond to, can be mapped or linked to, or otherwise can be associated with SDS references (SDS REF) (e.g., shadow references), such as SDS reference 310, that can be stored in the metadata 216 of the file 212, and sparse regions (SPAR REG), such as sparse region 312, which can be associated with the respective SDS references (e.g., SDS reference 310). The SDS references (e.g., SDS reference 310) can indicate or reference the storage region(s) in the second data store 112 where the data is stored.

The extent component 130 also can generate sparse extents (SPAR EXT), such as sparse extent 314, and can insert the respective sparse extents (e.g., 314) in respective locations of the extent map 132 that can correspond to, can be mapped or linked to, or otherwise can be associated with respective sparse regions (e.g., sparse region 316) in the metadata 216 of the file 212, wherein such sparse regions can be created for reasons other than the elimination of zero blocks from a write operation. The extent component 130 further can generate zero extents (ZERO EXT), such as zero extent 318 and zero extent 320, and can insert the respective zero extents (e.g., 318, 320) in respective locations of the extent map 132 that can correspond to, can be mapped or linked to, or otherwise can be associated with respective sparse regions (e.g., sparse regions 214 and 322) in the metadata 216 of the file 212, wherein such sparse regions (e.g., 214, 322) can be created by the ZBE component 128 after eliminating zero blocks from a write operation(s). The respective sparse regions (e.g., 214, 322) can relate to or be associated with respective storage regions (e.g., storage regions 210 and 324) of the first data store 104 where the zero blocks would have been stored had they not been eliminated from the write operation(s) by the ZBE process performed by the ZBE component 128. The sparse regions (e.g., 214, 322) and/or other metadata 216 can indicate or identify which storage regions (e.g., 210, 324) were removed from the write operations (e.g., due to the ZBE process, data deduplication process, or other process).

To facilitate desirably (e.g., suitably, accurately, or optimally) tracking the number of zero blocks eliminated from write operations, the DMC 120 also can comprise a counter component 134 that can create and maintain various counters, including a zero extent counter (ZEC) component 136, which can track and maintain a count of the number of zero extents employed by the file system, or a given file (e.g., file 212), at a given time. The ZEC component 136 can track and maintain the number of zero extents employed by the file system, or a given file, to facilitate determining how much storage space is being saved as a result of performing ZBE, wherein such information regarding storage space savings (e.g., reduction) can be utilized to facilitate determining various types of efficiency statistics, such as more fully described herein. The counter component 134 also can employ respective counters to count the number of block extents, the number of shadow extents, the number of sparse extents, or the number of another type of extent.

As disclosed herein, there potentially can be an overcount issue (e.g., multiple or double count issue) in storage space savings, if, as part of multiple write operations, multiple writes of zero data to a same storage region (e.g., same block) in the memory component are eliminated from the write operations due to ZBE, with each ZBE associated with the same storage region being counted as a separate storage space saving, and such overcount problem can undesirably skew, and render inaccurate, traditional efficiency statistics for the memory component. The disclosed subject matter can overcome and remedy this potential overcount issue.

In some embodiments, the extent component 130 can manage the generation and use of zero extents to only use and count a zero extent with regard to storage regions in the memory component 102 that do not already have zero extents. For example, with regard to the block of data 202, as disclosed, the ZBE component 128 can determine that the block of data 202 is a zero block, can eliminate the block of data 202 from the write operation, and can convert the storage region 210 to a sparse region 214 in the metadata 216, wherein the storage region 210 was not already currently associated with a zero block at the time the ZBE of block of data 202 was performed. The extent component 130 can analyze the metadata 216, including the extent map 132, to facilitate determining whether a zero extent is already associated with the storage region 210. Based at least in part on the results of the analysis, the extent component 130 can determine that the storage region 210 was not already currently associated with a zero extent at the time the ZBE of block of data 202 was performed, and thus, the storage region 210 will be transitioning from not being associated with a zero block to being associated with a zero block as a result of the ZBE of block of data 202. In response to determining that the storage region 210 has been transitioned from not being associated with a zero block to being associated with a zero block, the extent component 130 can determine that a zero extent can be generated with respect to the storage region 210 as a result of the ZBE of block of data 202. The extent component 130 can generate the zero extent 318, store the zero extent 318 in the extent map 132 associated with the file 212, wherein, in the extent map 132, the extent component 130 can associate (e.g., link or map) the zero extent 318 with (or to) the sparse region 214 and/or (directly or indirectly) the storage region 210.

The extent component 130 also can increment or facilitate incrementing the number of zero extents in the ZEC component 136 (e.g., increment the number of zero extents in the ZEC component 136 by one) to indicate that a new zero extent has been generated with regard to a storage region (e.g., the storage region 210) in the memory component 102 being transitioned from not being associated with a zero block to being associated with a zero block.

With regard to sparse region 322, the ZBE component 128 can eliminate a block of data from a write operation based on the block of data being determined to be a zero block and can convert the storage region 324 to sparse region 322 in the metadata 216 associated with the file 212. The extent component 130 can analyze the metadata 216, including the extent map 132, to facilitate determining whether a zero extent is already associated with the storage region 324. Based at least in part on the results of the analysis, the extent component 130 can determine that the storage region 324 already was currently associated with a zero extent (e.g., zero extent 320) at the time the ZBE was performed to remove the block of data, which was destined to be stored in storage region 324, from the write operation. In response to determining that the storage region 324 already is currently associated with the zero extent 320, the extent component 130 can determine that no new zero extent is to be generated with respect to the storage region 324 as a result of the ZBE process removing the block of data, which was destined to be stored in the storage region 324. The extent component 130 can associate (e.g., link or map) the zero extent 320 with (or to) the sparse region 322 in the extent map 132, and, as indicated, the zero extent 320 already was associated with (e.g., indirectly or directly associated with) the storage region 324 in the extent map 132 or other metadata 216.

Since the extent component 130 determined that the storage region 324 was previously associated with the zero extent 320, the extent component 130 also can determine that the number of zero extents in the ZEC component 136 is not to be changed (e.g., not to be modified or incremented). This can facilitate (e.g., enable) maintaining an accurate count of the number of storage regions (e.g., blocks) saved from being used to store zero blocks as a result of performing the ZBE process to eliminate zero blocks (e.g., block of data 202) from write operations.

The extent component 130 also can decrement (e.g., decrease) or facilitate decrementing the number of zero extents in the ZEC component 136 to indicate that a sparse region associated with a zero extent has been deleted or modified such that the sparse region is no longer associated with a zero block. For instance, in response to a write or delete operation to modify or delete the sparse region 214 such that the sparse region 214 will no longer be associated with or represent a zero block, the extent component 130 can remove (e.g., delete or eliminate) the zero extent 318 from the extent map 132, and can decrement or facilitate decrementing the number of zero extents in the ZEC component 136 (e.g., decrement the number of zero extents in the ZEC component 136 by one) to indicate or reflect that (e.g., account for) the sparse region 214 associated with the zero extent 318 being deleted or modified such that the sparse region 214 is no longer associated with or representing a zero block.

Figure 4:
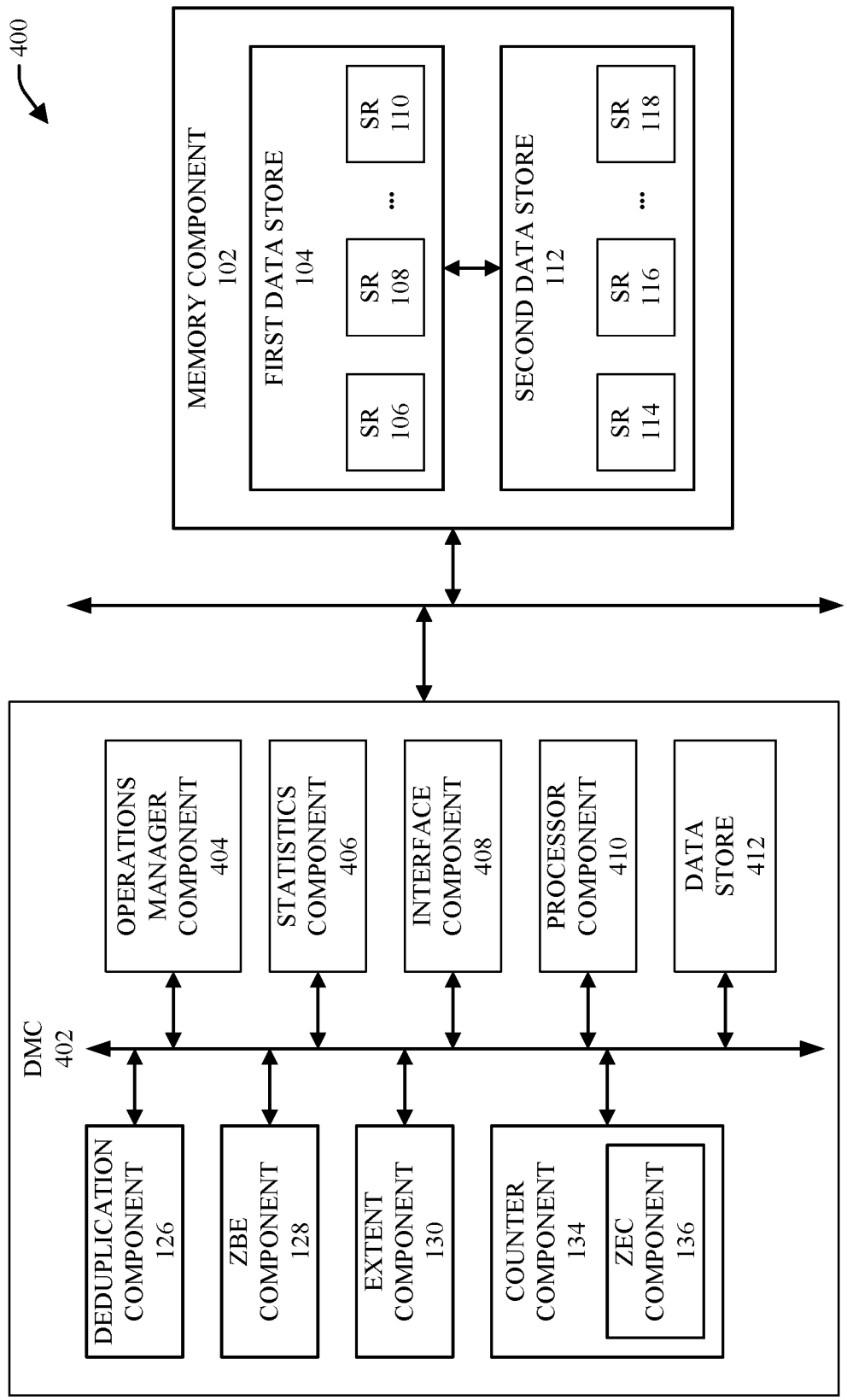
FIG. 4 depicts a block diagram of an example system that can desirably generate efficiency statistics that can be based at least in part on, and can desirably account for, reduction of usage of storage space in the memory component as a result of performing ZBE to remove zero blocks from write operations, and other savings or efficiencies relating thereto, associated with a file system, in accordance with various aspects and embodiments of the disclosed subject matter.

Turning to FIG. 4 (along with FIGS. 1, 2, and 3), FIG. 4 depicts a block diagram of an example system 400 that can desirably (e.g., efficiently, suitably, or optimally) generate efficiency statistics that can be based at least in part on, and can desirably (e.g., suitably, accurately, or optimally) account for, reduction of usage of storage space in the memory component 102 as a result of performing ZBE to remove zero blocks from write operations, and other savings or efficiencies relating thereto, associated with a file system, in accordance with various aspects and embodiments of the disclosed subject matter. The system 400 can be part of and/or employed with or by a node (e.g., Mode) or set (e.g., group or cluster) of nodes that can store, and manage the storage of, data. The system 400 can comprise the memory component 102, which can comprise the first data store 104 and the second data store 112, such as described herein. The first data store 104 can comprise storage regions, including storage regions 106, 108, and 110, such as described herein. The second data store 112 can comprise storage regions, including storage regions 114, 116, and 118, such as described herein. The system 400 also can comprise the DMC 402, which can include the deduplication component 126, ZBE component 128, extent component 130, counter component 134, and ZEC component 136, such as more fully described herein. The DMC 402 and its constituent components can comprise the same or similar respective functionality and features as respective components (e.g., respectively named components), such as more fully described herein The DMC 402 also can comprise an operations manager component 404, statistics component 406, interface component 408, processor component 410, and data store 412. The operations manager component 404 can control (e g, manage) operations associated with the DMC 402. For example, the operations manager component 404 can facilitate generating instructions to have components of the DMC 402 perform operations, and can communicate respective instructions to respective components (e.g., deduplication component 126, ZBE component 128, extent component 130, counter component 134, and ZEC component 136, statistics component 406, interface component 408, processor component 410, and data store 412) of the DMC 402 to facilitate performance of operations by the respective components of the DMC 402 based at least in part on the instructions, in accordance with the defined data management criteria and data management algorithm(s) (e.g., data management algorithms as disclosed, defined, recited, or indicated herein by the methods, systems, and techniques described herein). The operations manager component 404 also can facilitate controlling data flow between the respective components of the DMC 402 and controlling data flow between the DMC 402 and another component(s) or device(s) (e.g., memory component, write component, read component, file system, or other component or device) associated with (e.g., connected to) the DMC 402.

The statistics component 406 collect, determine, calculate, or generate a variety of statistics, including efficiency statistics, associated with the operations of the file system, the one or more nodes, and/or the various processes (e.g., write process, read process, ZBE process, data deduplication process, or other process) that can be performed by the system 400. The statistics component 406 can receive or collect information (e.g., count information) from the various counters, including the ZEC component 136, of the counter component 134. For instance, the statistics component 406 can receive, from the counter component 134, the count of the number of zero extents employed by the file system, or a given file (e.g., file 212), at a given time. The statistics component 406 also can receive, from the counter component 134, the counts of the respective numbers of block extents, shadow extents, sparse extents, or other type of extent employed by the file system, or a given file, at a given time.

At a desired time, the statistics component 406 can determine (e.g., calculate) the number of storage regions in the memory component 102 that were saved from being used as a result of the ZBE process based at least in part on the number of zero extents indicated by the zero extent count information received from the ZEC component 136. In some embodiments, the number of storage regions saved from being used as a result of the ZBE process can be equal to the number of zero extents, as indicated by the zero extent count information.

The statistics component 406 also can determine (e.g., calculate) a data reduction ratio associated with the memory component 102 based at least in part on (e.g., as a function of) the number of zero extents. The data reduction ratio can indicate an amount of logical data (e.g., logical size data) written to the memory component 102 in relation to (e.g., divided by) an amount of the physical storage space of the memory component 102 that is used to store data that is associated with the logical data, without including overhead information, such as, for example, error correction information (e.g., forward error correction (FEC) information), associated with the memory component 102. In some embodiments, zero extents of a file (e.g., file 212) are not included in the logical size of the file. As a result, the storage space savings resulting from ZBE are not reflected in or accounted for in the logical data. Since the storage regions saved from usage as a result of the ZBE process are not included in the logical data, the statistics component 406 can add the number of storage regions saved as a result of the ZBE process to the amount of logical data when determining the data reduction ratio. In some embodiments, the statistics component 406 can determine (e.g., calculate) the data reduction ratio as being equal to the amount (e.g. the number of storage regions or blocks) of logical data written to the memory component 102 plus the number of storage regions saved as a result of the ZBE process (e.g., as indicated by the number of zero extents) in relation to (e.g., divided by) the amount (e.g. the number of storage regions or blocks) of the physical storage space of the memory component 102 that is used to store data that is associated with the logical data, without including (e.g., without counting) the overhead information.

The statistics component 406 also can determine (e.g., calculate) a storage efficiency ratio associated with the memory component 102 based at least in part on (e.g., as a function of) the number of zero extents. The storage efficiency ratio can indicate the amount of logical data written to the memory component 102 in relation to (e.g., divided by) the amount of the physical storage space of the memory component 102 that is used to store data that is associated with the logical data. The storage efficiency ratio can be similar to the data reduction ratio, but the data reduction ratio does not take into account the overhead information associated with the memory component 102. In certain embodiments, the statistics component 406 can determine (e.g., calculate) the storage efficiency ratio as being equal to the amount (e.g. the number of storage regions or blocks) of logical data written to the memory component 102 plus the number of storage regions saved as a result of the ZBE process in relation to (e.g., divided by) the amount (e.g. the number of storage regions or blocks) of the physical storage space of the memory component 102 that is used to store data that is associated with the logical data.

In some embodiments, the statistics component 406 can determine (e.g., calculate) a zero reduction ratio associated with the memory component 102 based at least in part on (e.g., as a function of) the number of zero extents. The zero reduction ratio can indicate the amount of logical data written to the memory component 102 in relation to (e.g., divided by) the amount of the physical storage space of the memory component 102 that is used to store data that is associated with the logical data. The zero reduction ratio can relate to the amount of the reduction of the use of the physical storage space (e.g., storage regions) in the memory component 102 due to the ZBE process. The zero reduction ratio can indicate an amount of physical storage space in the memory component 102 that is saved due to the ZBE process in relation to an amount of the physical storage space of the memory component 102 that is used to store data that is associated with the logical data, without including the overhead information associated with the memory component. In certain embodiments, the statistics component 406 can determine (e.g., calculate) the zero reduction ratio as being equal to the amount (e.g. the number of storage regions or blocks) of physical storage space in the memory component 102 that is saved due to the ZBE process in relation to (e.g., divided by) the amount (e.g. the number of storage regions or blocks) of the physical storage space of the memory component 102 that is used to store data associated with the logical data, without including the overhead information associated with the memory component 102.

In some instances, when a zero block is being written, there can be error correction information (e.g., FEC information) associated with the zero block. Performing the ZBE process to eliminate a block from a write operation also can result in the elimination of the error correction information from the write operation. The statistics component 406, when determining certain statistics, such as the storage efficiency ratio, the zero reduction ratio, or the amount of storage savings resulting from performing the ZBE process, the statistics component 406 can determine such statistics to take into account the additional storage space savings obtained from the elimination of error correction information when performing the ZBE process to eliminate a block(s) of data from a write operation.

The statistics component 406 also can include a zero block count in a node summary for a node (e.g., Mode). In certain embodiments, zero extents in a block or extent map can be tagged (e.g., differently tagged) to differentiate zero extents from sparse extents.

The statistics component 406 also can collect, maintain, monitor, or determine information regarding various other types of statistics as well. For instance, the statistics component 406 can collect, maintain, monitor, or determine information regarding the number of data blocks in a file, node, or file system, the number of blocks used as protection blocks in a file, node, or file system, the number of physical blocks in a file, node, or file system, the number of logical blocks in a file, node, or file system, or other desired statistics. Such other statistics can comprise, for example:

zero block: the number of write blocks containing only zero values (e.g., with all zero bits) that are converted to sparse regions or blocks;

punch block: the number of blocks in the native file converted to sparse;

zero miss: the number of times the zero block check has not found a match; and zero match: the number of times the zero block check has found (e.g., identified) a match (e.g., found a block that contains only zero values).

The interface component 408 can comprise various interfaces, such as, for example, a display screen, display interfaces, audio interfaces, haptic interface, or other desired interfaces, to facilitate (e.g., enable) presenting information to a user or a device (e.g., communication device, such as a computer, server, or mobile (e.g., smart) phone) or receiving information (e.g., query or request for statistics) from a user or device. For instance, the interface component 408 can present (e.g., display or communicate) efficiency statistics, such as a data reduction ratio, a storage efficiency ratio, a zero reduction ratio, or a number of storage regions saved due to the ZBE process, to a user or device. The interface component 408 also can receive queries or requests for statistics (e.g., efficiency statistics) from the user or device via an interface (e.g., keyboard, mouse, touch screen display, or communication interface) of the interface component 408. In certain embodiments, the interface component 408 can receive a query for a desired statistic (e.g., efficiency statistic) using a desired namespace approach, wherein, for example, a query can be for cluster.data.reduce.zero to obtain a statistic regarding zero block reduction savings, or a query can be for cluster.data.reduce.ratio.zero to obtain the zero reduction ratio.

The disclosed subject matter also can employ and manage a quota function with regard to the memory component 102. The ZBE process to remove zero blocks from write operations can result in less blocks being written to some files, and, as a result, there can be less blocks allocated. This can reduce a file's contribution to quota usage. In some embodiments, the quota function can comprise a resource type defined for the zero blocks node attribute. Also, a quota list view, which can comprise statistics relating to quota (e.g., as determined by the statistics component 406), can display zero block savings gained from the ZBE process per quota domain.

The processor component 410 can work in conjunction with the other components (e.g., deduplication component 126, ZBE component 128, extent component 130, counter component 134, and ZEC component 136, operations manager component 404, statistics component 406, interface component 408, and data store 412) to facilitate performing the various functions of the DMC 402. The processor component 410 can employ one or more processors, microprocessors, or controllers that can process data, such as information relating to files, file systems, ZBE process, inline data deduplication, post-process data deduplication, hash values, metadata (e.g., FDS identifiers, SDS identifiers, SDS reference values), statistics (e.g., efficiency statistics), queries, parameters, traffic flows, policies, defined data management criteria, algorithms (e.g., data management algorithms, ZBE algorithms, data deduplication algorithms, statistics algorithms, hash algorithms, compression algorithms, decompression algorithms, and/or other algorithm), protocols, interfaces, tools, and/or other information, to facilitate operation of the DMC 402, as more fully disclosed herein, and control data flow between the DMC 402 and other components (e.g., memory component, write component, read component, file system, or other component) associated with the DMC 402.

The data store 412 can store data structures (e.g., user data, metadata), code structure(s) (e.g., modules, objects, hashes, classes, procedures) or instructions, information relating to files, file systems, ZBE process, inline data deduplication, post-process data deduplication, hash values, metadata (e.g., FDS identifiers, SDS identifiers, SDS reference values), statistics (e.g., efficiency statistics), queries, parameters, traffic flows, policies, defined data management criteria, algorithms (e.g., data management algorithms, ZBE algorithms, data deduplication algorithms, statistics algorithms, hash algorithms, compression algorithms, decompression algorithms, and/or other algorithm), protocols, interfaces, tools, and/or other information, to facilitate controlling operations associated with the DMC 402. In an aspect, the processor component 410 can be functionally coupled (e.g., through a memory bus) to the data store 412 in order to store and retrieve information desired to operate and/or confer functionality, at least in part, to the deduplication component 126, ZBE component 128, extent component 130, counter component 134, and ZEC component 136, operations manager component 404, statistics component 406, interface component 408, and data store 412, or other component, and/or substantially any other operational aspects of the DMC 402.

Figure 5:
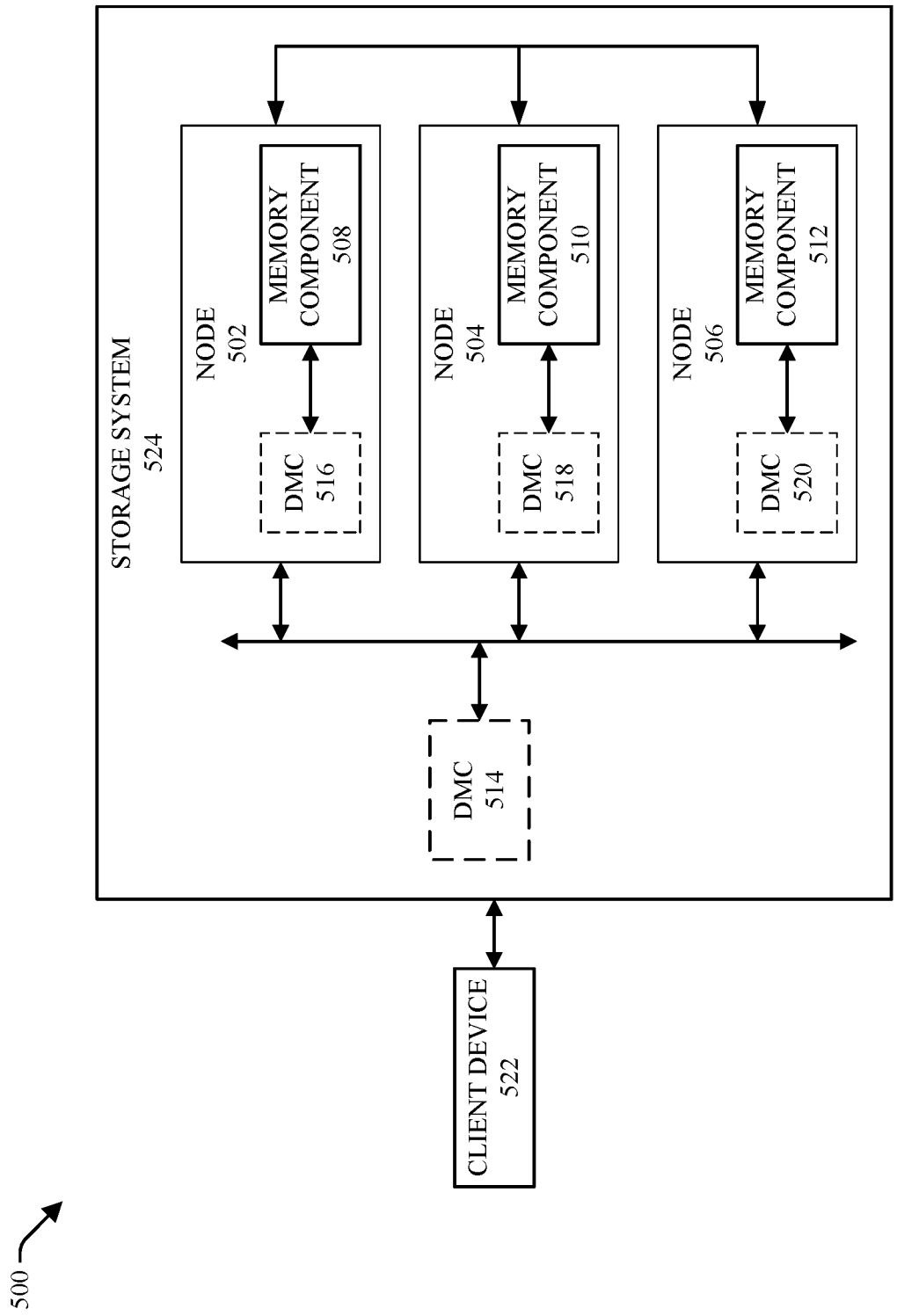
FIG. 5 illustrates a block diagram of an example system that can desirably manage performing ZBE, including accounting for reduction in utilization of storage space of a group of memory components of a group of nodes resulting from performing ZBE, associated with a file system, and generate efficiency statistics relating thereto, in accordance with various aspects and embodiments of the disclosed subject matter.

FIG. 5 illustrates a block diagram of an example system 500 that can desirably (e.g., efficiently, suitably, or optimally) manage performing ZBE, including accounting for reduction in utilization of storage space of a group of memory components of a group of nodes resulting from performing ZBE, associated with a file system, and generate efficiency statistics relating thereto, in accordance with various aspects and embodiments of the disclosed subject matter.

The system 500 can comprise a group of nodes (e.g., group, set, or cluster of Modes), including nodes 502, 504, and 506, that can perform operations (e.g., write, read, delete, overwrite, modify, manipulate, calculate, or other operation) on data stored in or associated with the group of nodes. The system 500 also can comprise a group of memory components, including memory components 508, 510, and 512, wherein each memory component can be part of a node of the group of nodes (e.g., 502, 504, 506). Each memory component of the group of memory components (e.g., 508, 510, 512) can comprise respective data stores and storage regions for storage of data (e.g., blocks or chunks of data), as more fully described herein. The group of nodes (e.g., 502, 504, 506) and associated group of memory components (e.g., 508, 510, 512) can be part of, can form, and/or can implement a file system, and/or respective nodes and their respective components can form or implement respective file systems and/or respective file subsystems. The nodes (e.g., 502, 504, 506) can be communicatively connected to each other to facilitate sharing of information between the nodes and to enable the nodes to operate as a cohesive file system and data storage system.

In accordance with various embodiments, the system 500 can comprise a DMC 514 that can be associated with (e.g., communicatively connected to) the group of nodes (e.g., 502, 504, 506) and/or each node of the group of nodes can comprise a DMC, such as DMCs 516, 518, and/or 520. The DMC(s) (e.g., 514, 516, 518, and/or 520) can perform and/or manage performance of a variety of data reduction or storage efficiency processes, including the ZBE process, can desirably (e.g., suitably, accurately, or optimally) account for respective or overall reduction in utilization of respective or overall storage space in respective or all memory components of the group of memory components resulting from performing ZBE (or other data reduction or storage efficiency processes), as more fully described herein. The DMC(s) (e.g., 514, 516, 518, and/or 520) also can determine, calculate, and/or generate desirable (e.g., suitable, accurate, or optimal) efficiency statistics relating to data reduction, storage efficiency, and/or ZBE associated with the file system, respective or all nodes of the group of nodes (e.g., 502, 504, 506), and/or respective or all memory components of the group of memory components (e.g., 508, 510, 512), as more fully described herein.

In some embodiments, if there is a DMC (e.g., 516, 518, 520) in each node (e.g., 502, 504, 506), the DMCs can communicate and share information with each other and/or with DMC 514 (if there is a DMC 514 in the system) to facilitate (e.g., enable) controlling operations (e.g., write operations, read operations, ZBE operations, data deduplication operations, or other operations) of the file system and/or determining efficiency statistics associated with respective nodes (e.g., 502, 504, 506) or the file system. In certain embodiments, one of the DMCs (e.g., 514, 516, 518, or 520) can act as a master DMC with respect to the other DMCs.

At given times, one or more clients can utilize a client device, such as client device 522, to communicate with and access storage system 524, which can comprise the group of nodes (e.g., node 502, node 504, node 506, and/or another node(s)) and/or the one or more DMCs (e.g., DMC 514, DMC 516, DMC 518, DMC 520, and/or another DMC(s)). The client device 522 can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, . . . ), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device. The client device 522 can communicate a client request to the storage system 524 to request that the storage system 524 access or retrieve information stored in the storage system 524, write or store information to or in the storage system 524, process information stored in the storage system 524 or received from the client device 522 or other data source (e.g., other device), and/or perform other operations on information of or associated with the storage system 524, such as described herein.

Figure 6:
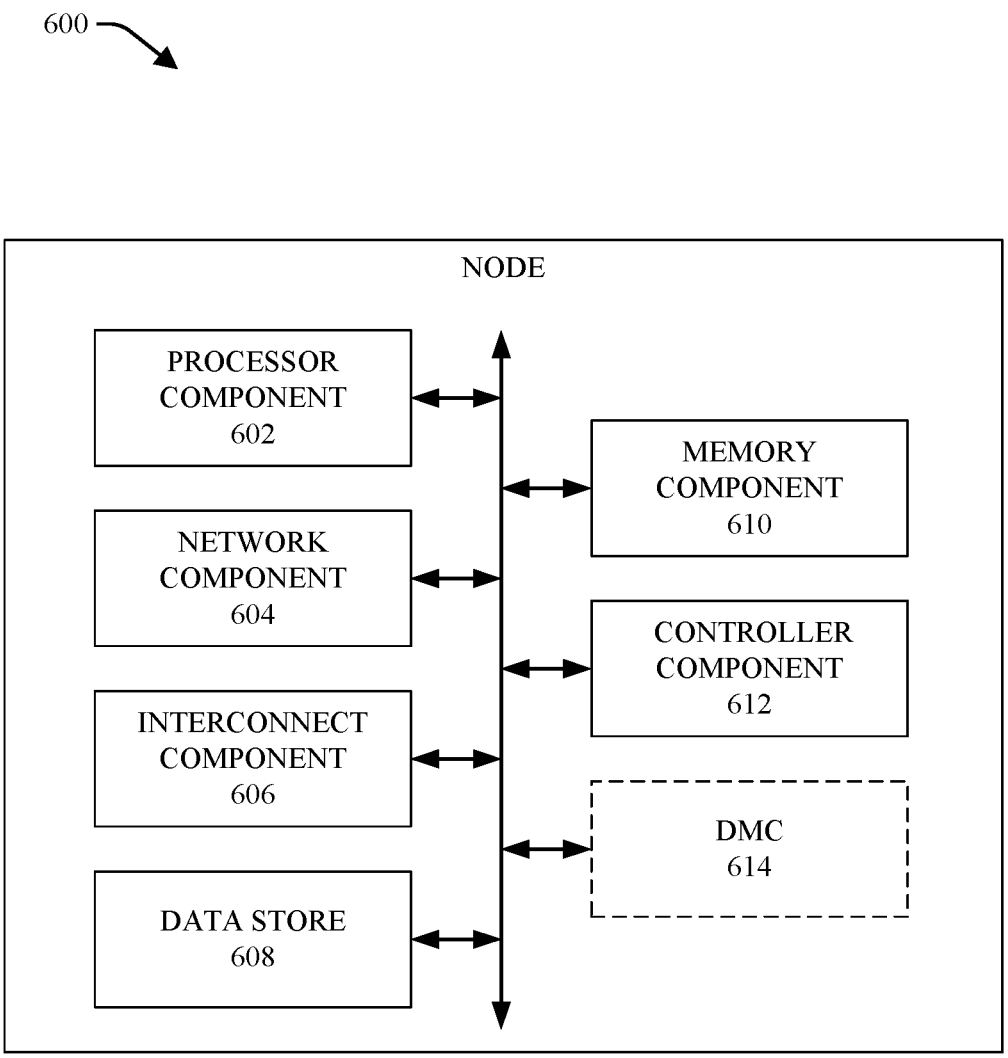
FIG. 6 depicts a block diagram of an example node, in accordance with various aspects and embodiments of the disclosed subject matter.

FIG. 6 depicts a block diagram of an example node 600, in accordance with various aspects and embodiments of the disclosed subject matter. The node 600 can be employed to store data, manage data, service client requests of clients, and/or perform other desired operations on data, such as described herein. The node 600 can comprise various components, including a processor component 602, a network component 604, an interconnect component 606, a data store 608, a memory component 610, a controller component 612, and/or other desired components. In accordance with various embodiments, the node 600 can comprise or be associated with a DMC 614.

The processor component 602 can include can work in conjunction with the other components (e.g., network component 604, interconnect component 606, data store 608, memory component 610, controller component 612, and/or DMC 614) to facilitate performing the various functions of the node 600. The processor component 602 can employ one or more processors (e.g., one or more CPUs), microprocessors, or controllers that can process data, such as information relating to files, file systems, communication connection operations, read operations, write operations, data storage operations, data or file search operations, networking of nodes, queries, metadata, parameters, traffic flows, policies, algorithms (e.g., data management algorithms, hash algorithms, compression algorithms, decompression algorithms), protocols, interfaces, tools, and/or other information, to facilitate operation of the node 600, and control data flow between the node 600 and other components (e.g., another node(s), DMC, client device, file system, or other component) associated with the node 600.

The network component 604 can comprise network sub-components (e.g., Ethernet component (e.g., Ethernet ports and associated Ethernet sub-components), wireless communication connection component, . . . ) that can enable the node 600 to network and communicate with one or more other nodes (e.g., nodes of a cluster of nodes), the DMC, client devices, and/or other components or devices. The network can employ IP for node-to-node communication between the node 600 and other nodes (e.g., other nodes of the cluster of nodes) associated with the node 600. For instance, a cluster of nodes of the storage system can comprise a back-end network, which can act as a backplane for the node cluster, wherein can enable isolating node-to-node communication (e.g., between the node 600 and other nodes of the cluster) to a private, high-speed, low-latency network. The network component 604 can support and utilize desired network communication protocols to communicate with other components or devices in a communication network (e.g., Internet, intranet, customer network, or other type of communication network), wherein the network communication protocols can comprise, for example, network file system (NFS), server message block (SMB), hypertext transfer protocol (HTTP), file transfer protocol (FTP), Hadoop distributed file system (HDFS), OpenStack Swift, and/or other desired network communication protocols. The network component 604 also can comprise IP functionality that can allow the network component 604 and associated storage system to utilize communication protocols, such as IPv4 and IPv6, and be fully integrated with IPv4 and IPv6 environments. The node 600 can be associated with (e.g., assigned) respective IP addresses, including virtual IP addresses, that can be employed to facilitate enabling the node 600 to connect to client devices, other nodes, and/or other components or devices. If the node 600 is offline for any reason, the IP addresses (e.g., virtual IP addresses) of the node 600 can be migrated (e.g., moved or transferred) to another node of the cluster to facilitate redistributing client devices of clients to other nodes of the cluster if the node 600 is offline.

The interconnect component 606 can be associated with the network component 604 and/or other components to facilitate providing desired interconnects to the network component 604 and/or the other components. For instance, in some embodiments, a portion of the interconnect component 606 can be part of the network component 604. The interconnect component 606 can comprise various types of interconnects (e.g., interconnect sub-components) that can be utilized to connect the node 600 to other nodes of the cluster of nodes, connect various components (e.g., processor component 602, data store 608, memory component 610, controller component 612, DMC 614, or other component) of the node 600, or connection the node 600 to other components (e.g., another node(s), DMC, client device, file system, or other component) of the storage system. The interconnects can comprise, for example, Ethernet interconnects or other low-latency interconnects (e.g., low-latency InfiniBand interconnects) that can be utilized to provide desirably fast and low-latency connections between respective components of or associated with the node 600. For instance, the memory component 610 (e.g., memory cache of the memory component 610) can communicate via a desirably fast (e.g., low-latency) interconnect (e.g., internal interconnect) of the interconnect component 606 to another memory component(s) of another node(s) of the cluster of nodes to desirably communicate or otherwise make available the data in the memory component 610 to the other memory component(s) or to access data in the other memory component(s), wherein such interconnect can have a significantly lower latency than accessing a hard disk drive of a node. The interconnect component 606 also can comprise desirably fast interconnects between different memory sub-components (e.g., different caches) of the memory component 610.

The data store 608 can store data structures (e.g., user data, metadata), code structure(s) (e.g., modules, objects, hashes, classes, procedures) or instructions, information relating to files, file systems, communication connection operations, read operations, write operations, data storage operations, data or file search operations, networking of nodes, queries, metadata, parameters, traffic flows, policies, algorithms (e.g., data management algorithms, hash algorithms, compression algorithms, decompression algorithms), protocols, interfaces, tools, and/or other information, to facilitate controlling operations associated with the node 600. In an aspect, the processor component 602 can be functionally coupled (e.g., through a memory bus) to the data store 608 in order to store and retrieve information desired to operate and/or confer functionality, at least in part, to the network component 604, interconnect component 606, data store 608, memory component 610, controller component 612, etc., and/or substantially any other operational aspects of the node 600.

The memory component 610 can include one or more volatile or non-volatile memory sub-components (e.g., cache memory) that can be utilized to store data, such as the various types of data disclosed herein. The memory sub-components of the memory component 610 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), and/or other desired type of memory. One or more memory sub-components can be one or more caches.

The controller component 612 can be or can comprise a disk controller that can enable the processor component 602, or portion thereof, to communicate with the data store 608 (e.g., a hard disk of the data store 608) or other type of storage media or storage drive (e.g., disk drive) of or associated with the node 600. The controller component 612 also can provide or facilitate providing an interface between the hard disk or disk drive and other components of the node 600.

The DMC 614 can manage data and operations associated with the node 600 and/or associated file system, including controlling write operations, read operations, data deduplication operations, comprising inline data deduplication operations and post-process data deduplication operations, ZBE operations, statistics operations (e.g., determining or calculating statistics, such as efficiency statistics), and/or other operations of the node 600 or associated file system, as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
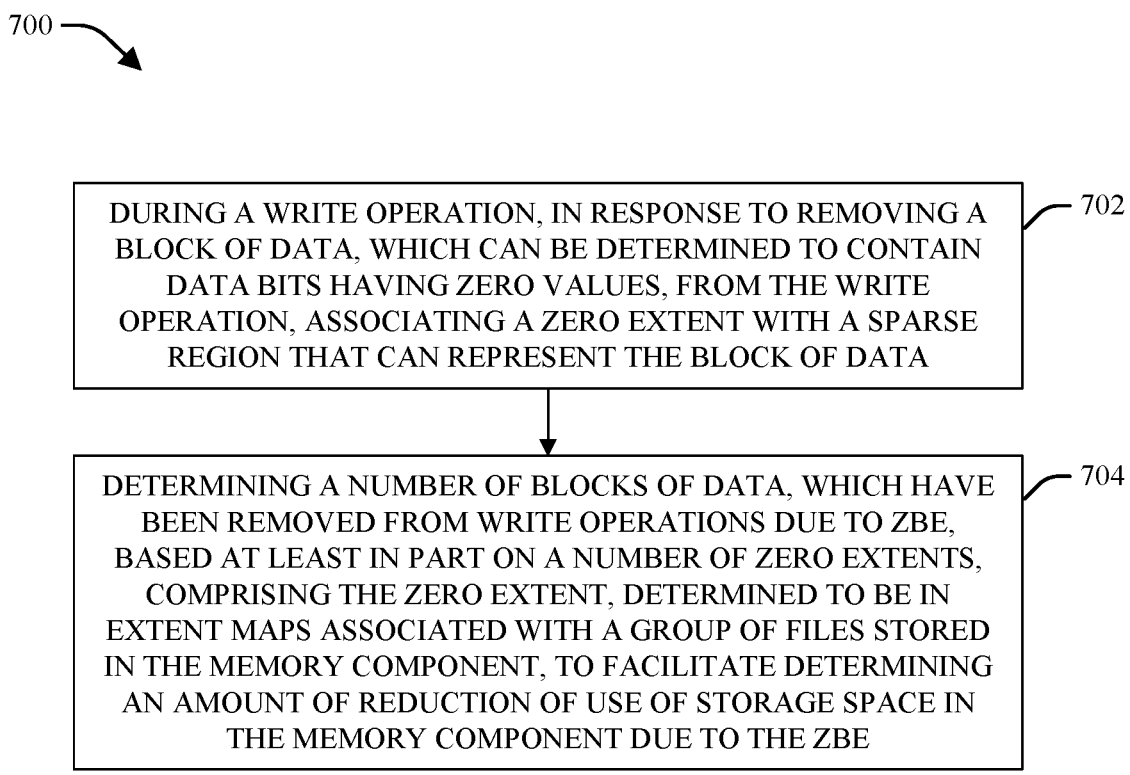
FIG. 7 illustrates a flow chart of an example method that can associate a zero extent with a sparse region created during ZBE to remove a block of data from a write operation to facilitate determining an amount of reduction of use of storage space in a memory component due to ZBE, in accordance with various aspects and embodiments of the disclosed subject matter.
Figure 8:
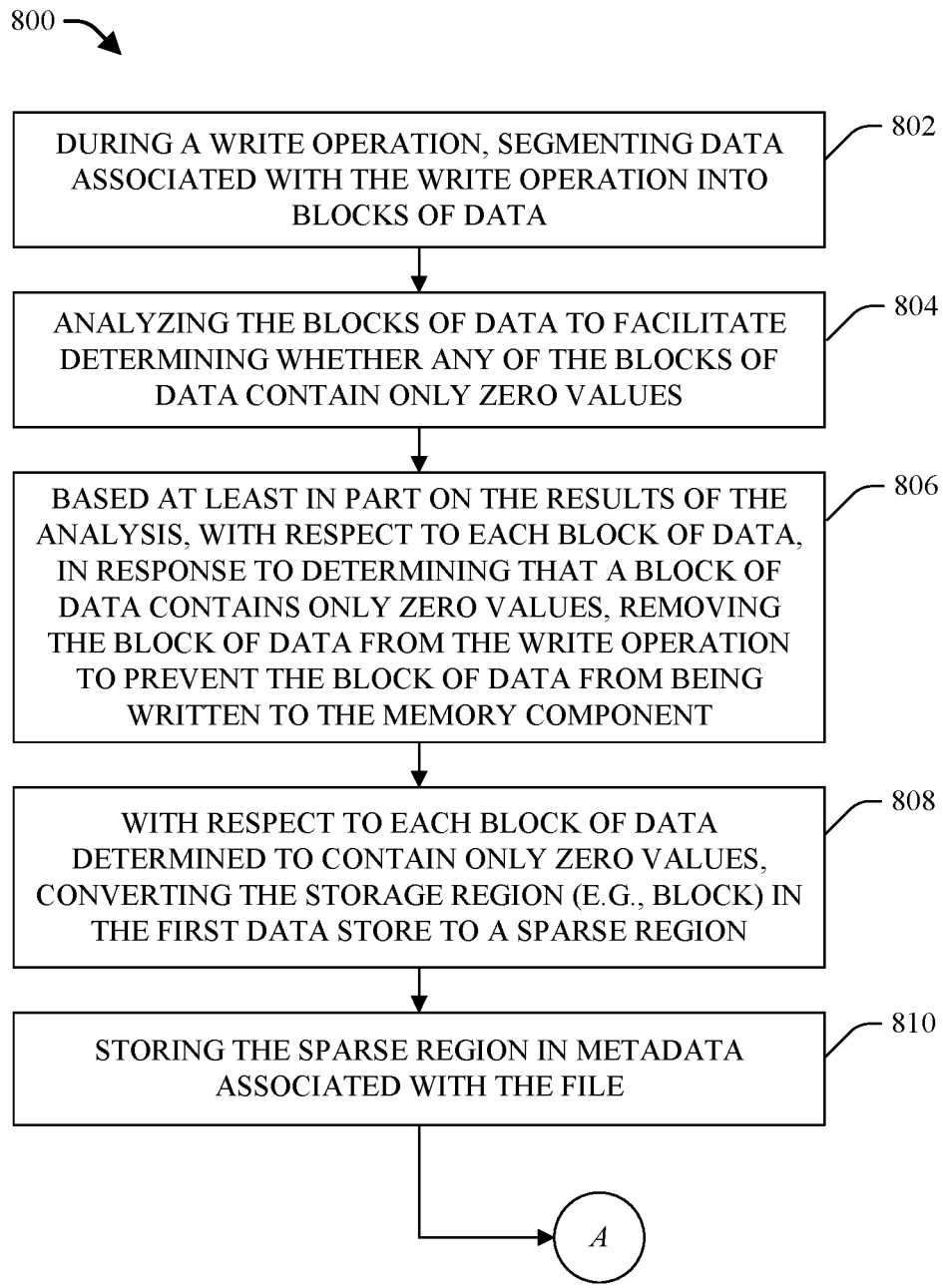
FIG. 8 presents a flow chart of an example method that can perform ZBE to remove a block of data, which contains all zero values, from a write operation, in accordance with various aspects and embodiments of the disclosed subject matter.
Figure 9:
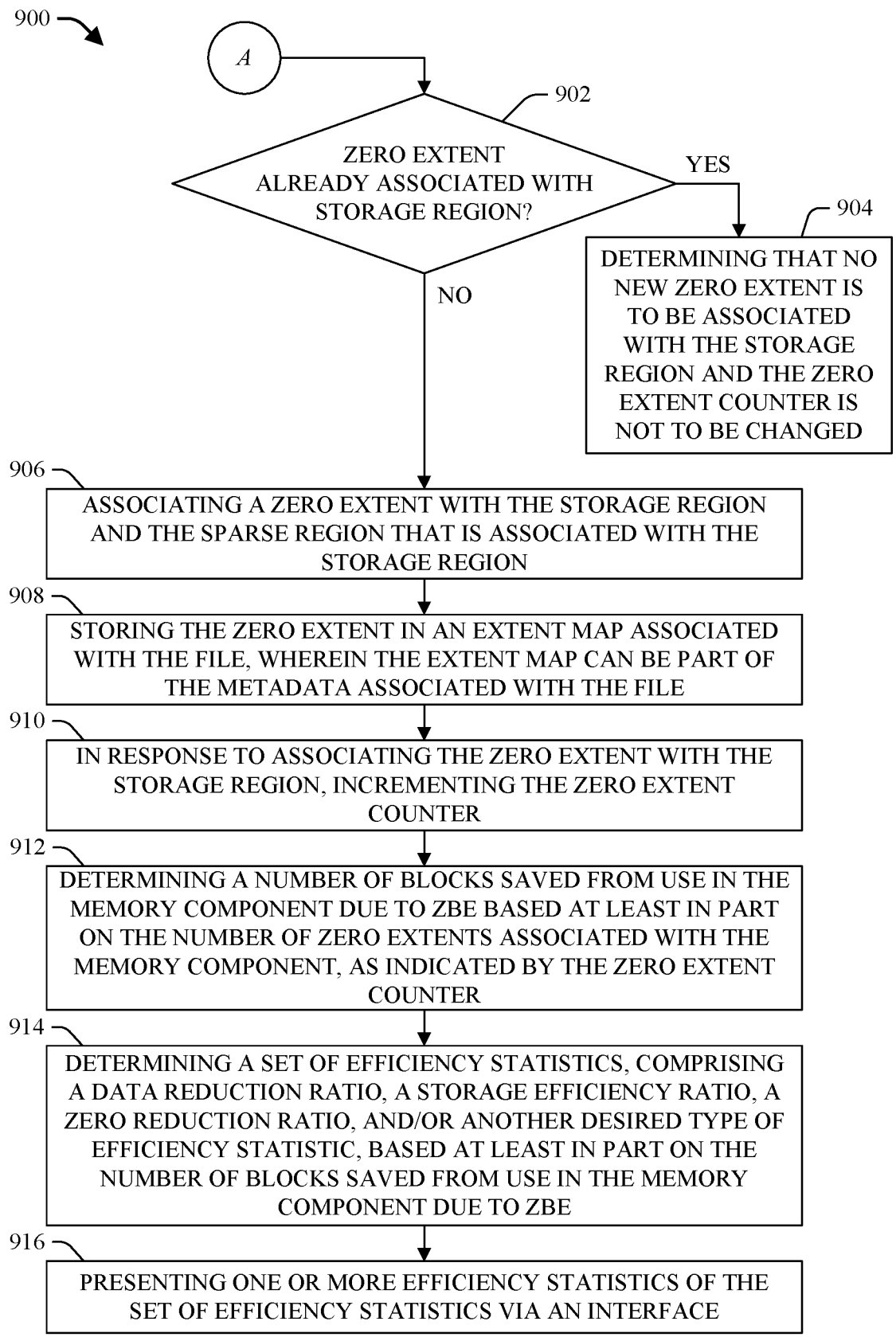
FIG. 9 illustrates a flow chart of an example method that can associate a zero extent with a sparse region created during ZBE to remove a block of data from a write operation to facilitate determining efficiency statistics relating at least in part to an amount of reduction of use of storage space in a memory component due to ZBE, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can associate a zero extent with a sparse region created during ZBE to remove a block of data from a write operation to facilitate determining an amount of reduction of use of storage space in a memory component due to ZBE, in accordance with various aspects and embodiments of the disclosed subject matter. The method 700 can be employed by, for example, a system comprising the DMC, a processor component (e.g., of or associated with the DMC), and/or data store (e.g., of or associated with the DMC and/or the processor component).

At 702, during a write operation, in response to removing a block of data, which can be determined to contain data bits having zero values, from the write operation, a zero extent can be associated with a sparse region that can represent the block of data. The write component can initiate execution of the write operation to write data, including the block of data, to a file in the data store (e.g., first data store or second data store of the memory component). The DMC, employing the ZBE, can determine that the block of data can contain data bits that are all zero values. In response to determining that the block of data contains data bits that are all zero values, the ZBE can remove (e.g., eliminate) the block of data (e.g., zero block) from the write operation. In response to performing ZBE to remove the block of data from the write operation, the DMC can associate (e.g., link or map) the zero extent with the sparse region that can represent the block of data (e.g., after determining that no zero extent is already associated with the storage region in the memory component (e.g., first data store or second data store) to which the block of data was to have been written before ZBE was performed). The sparse region can be stored in metadata associated with the file. The zero extent can be stored in an extent map associated with the file and stored in the metadata.

At 704, a number of blocks of data, which have been removed from write operations due to ZBE, can be determined based at least in part on a number of zero extents, comprising the zero extent, determined to be in extent maps associated with a group of files stored in the memory component, to facilitate determining an amount of reduction of use of storage space in the memory component due to the ZBE. The DMC can determine the number of blocks of data (e.g., zero blocks), which have been removed from write operations due to ZBE, based at least in part on the number of zero extents that are determined to be in the extent maps associated with the group of files stored in the memory component, to facilitate determining the amount of reduction of use of storage space (e.g., physical storage blocks) in the memory component due to the performing of ZBE. The DMC can utilize the number of blocks of data removed from write operations due to ZBE to determine various desired efficiency statistics, such as, for example, a data reduction ratio, a storage efficiency ratio, a zero reduction ratio, and/or another desired efficiency statistic associated with the memory component. The efficiency statistics, or a desired portion thereof, can be presented (e.g., displayed or communicated) to a user (e.g., service technician, customer, or other desired person) or a device (e.g., computer or other communication device) for consideration or further processing.

FIG. 8 presents a flow chart of an example method 800 that can perform ZBE to remove a block of data, which contains all zero values, from a write operation, in accordance with various aspects and embodiments of the disclosed subject matter. The method 800 can be employed by, for example, a system comprising the DMC, a processor component (e.g., of or associated with the DMC), and/or data store (e.g., of or associated with the DMC and/or the processor component).

At 802, during a write operation, data associated with the write operation can be segmented into blocks of data. During a write operation to write the data to a file in the memory component (e.g., a native file in the first data store in the memory component), the DMC can segment (e.g., partition) the data into the blocks of data (e.g., chunks or subsets of data).

At 804, the blocks of data can be analyzed to facilitate determining whether any of the blocks of data contain only zero values. The DMC can analyze the blocks of data to determine whether any of the blocks of data contain only zero values (e.g., whether, for each data block, the data block contains zero values for each of the data bits of that data block).

At 806, based at least in part on the results of the analysis, with respect to each block of data, in response to determining that a block of data contains only zero values, the block of data can be removed from the write operation to prevent the block of data from being written to the memory component. With respect to each block of data, in response to the DMC determining that a block of data contains only zero values, the DMC can remove the block of data from the write operation to prevent that block of data from being written to the memory component (e.g., the first data store or the second data store of the memory component).

At 808, with respect to each block of data determined to contain only zero values, the storage region (e.g., block) in the memory component (e.g., the first data store) can be converted to a sparse region. At 810, the sparse region can be stored in metadata associated with the file. With respect to each block of data determined to contain only zero values, the DMC can convert the storage region where the block of data would have been stored in the file in the memory component to a sparse region, which can be stored in the metadata associated with the file, wherein the metadata can be stored in the memory component. The converting of the storage region to the sparse region can facilitate preventing an unnecessary writing of all zero values of the block of data to the memory component (e.g., to the first data store in the memory component). The metadata can comprise a zero block reference value that can facilitate identifying the location of the sparse region in the file (e.g., the location of the sparse region associated with the block of data relative to the locations of other blocks of data in the file) and identifying that such location contains the sparse region and/or that the block of data contains only zero values.

In some embodiments, at this point, the method 800 can proceed to reference point A, wherein method 900, as depicted in FIG. 9, can proceed from reference point A to associate a zero extent with a sparse region created during ZBE to remove a block of data from a write operation to facilitate determining efficiency statistics relating at least in part to an amount of reduction of use of storage space in a memory component due to ZBE, as described herein.

FIG. 9 illustrates a flow chart of an example method 900 that can associate a zero extent with a sparse region created during ZBE to remove a block of data from a write operation to facilitate determining efficiency statistics relating at least in part to an amount of reduction of use of storage space in a memory component due to ZBE, in accordance with various aspects and embodiments of the disclosed subject matter. The method 900 can be employed by, for example, a system comprising the DMC, a processor component (e.g., of or associated with the DMC), and/or data store (e.g., of or associated with the DMC and/or the processor component). In some embodiments, the method 900 can proceed from reference point A, as indicated with regard to the method 800, as depicted in FIG. 8.

At 902, in response to removing a block of data, which contained all zero values, from the write operation, a determination can be made regarding whether a zero extent is already associated with the storage region to which the block of data initially was to be stored before ZBE was performed to remove the block of data from the write operation. The DMC can analyze information, including metadata, associated with the storage region. Based at least in part on the analysis results, the DMC can determine whether a zero extent (e.g., in an extent map in the metadata) is already associated with the storage region in the memory component to which the block of data initially was to be stored before ZBE was performed to remove the block of data from the write operation.

In response to determining that a zero extent is already associated with the storage region, at 904, it can be determined that no new zero extent is to be associated with the storage region and the zero extent counter is not to be changed. In response to determining that a zero extent is already associated with the storage region, the DMC can determine that no new zero extent is to be associated with the storage region and the zero extent counter is not to be changed (e.g., not to be incremented).

Referring again to reference numeral 902, if, instead, it is determined that no zero extent is associated with the storage region, at 906, a zero extent can be associated with the storage region and the sparse region that is associated with the storage region. At 908, the zero extent can be stored in an extent map associated with the file, wherein the extent map can be part of the metadata associated with the file.

At 910, in response to associating the zero extent with the storage region, the zero extent counter can be incremented. In response to associating the zero extent (e.g., a new zero extent) with the storage region and the sparse region, the DMC can increment (e.g., increment by one) the zero extent counter associated with the memory component.

At 912, a number of blocks saved from use in the memory component due to ZBE can be determined based at least in part on the number of zero extents associated with the memory component, as indicated by the zero extent counter. The DMC can analyze the zero extent counter and can determine the number of blocks that have been saved from use in the memory component due to the performance of ZBE based at least in part on (e.g., as a function of) the number of zero extents associated with the memory component, as indicated by the zero extent counter. In some embodiments, the number of blocks saved can be equal to the number of zero extents counted by the zero extent counter.

At 914, a set of efficiency statistics, comprising a data reduction ratio, a storage efficiency ratio, a zero reduction ratio, and/or another desired type of efficiency statistic, can be determined based at least in part on the number of blocks saved from use in the memory component due to ZBE. The DMC can determine (e.g., calculate) the set of efficiency statistics based at least in part on (e.g., as a function of) the number of blocks saved from use in the memory component due to ZBE and/or other information relating to reduction of the usage of blocks in the memory component due to other types of efficiency operations or techniques (e.g., data deduplication, data compression, or other type of efficiency operation or technique).

At 916, one or more efficiency statistics of the set of efficiency statistics can be presented via an interface. The DMC and/or other component associated therewith can present (e.g., display or communicate) the one or more efficiency statistics via a desired interface (e.g., display screen, audio interface, data communication interface, or other desired interface).

Figure 10:
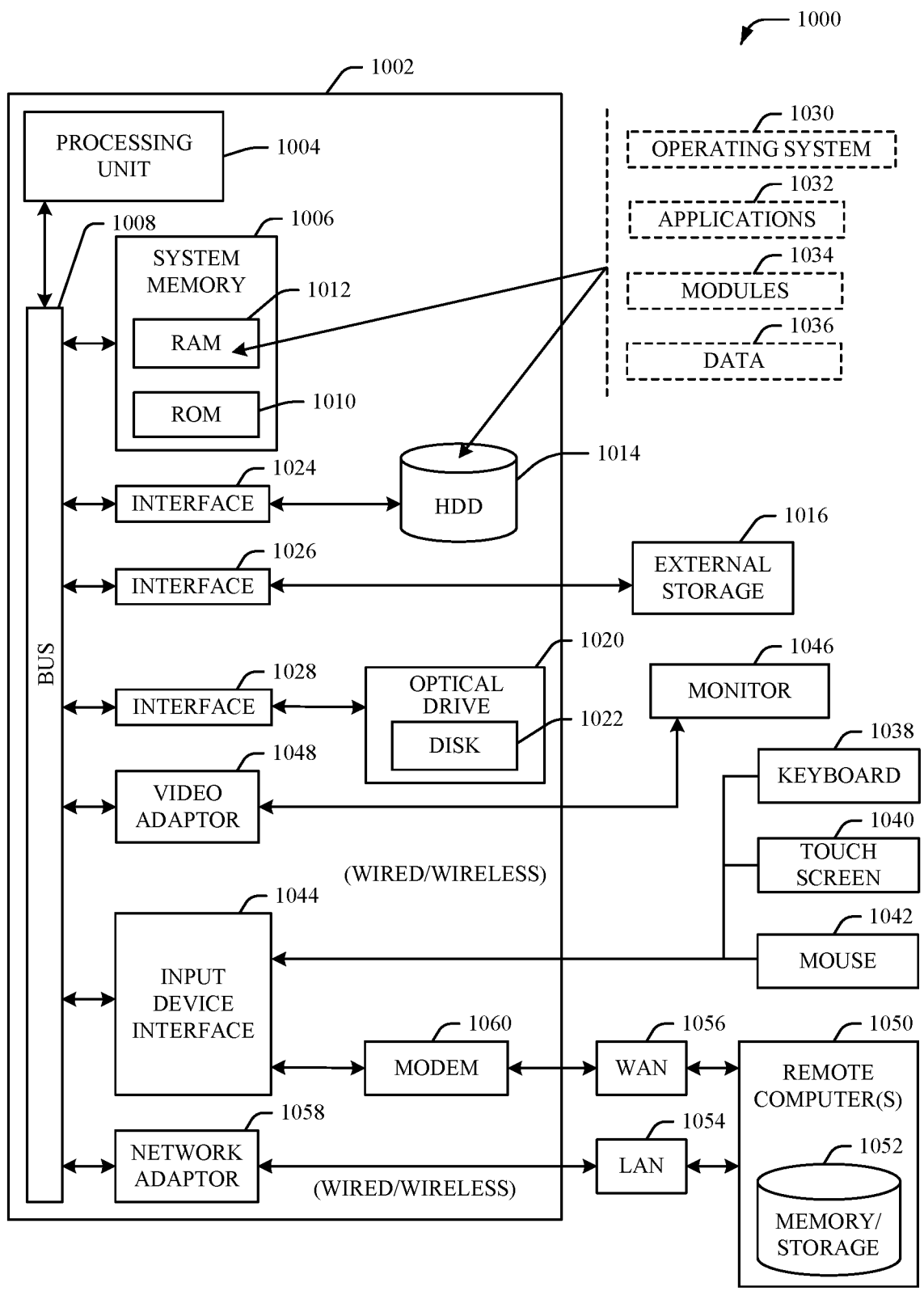
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056, e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., DMC, deduplication component, ZBE component, memory component, first data store, second data store, node, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   during a write operation, in response to removing a chunk of data, which is determined to contain data bits having zero values, from the write operation, associating, by a system comprising a processor, a zero extent with a sparse region that represents the chunk of data; and
   determining, by the system, a first number of chunks of data that have been removed from write operations due to zero data chunk removal based at least in part on a second number of zero extents, comprising the zero extent, determined to be in extent maps associated with a group of files stored in a memory component, to facilitate determining an amount of reduction of use of physical storage space in the memory component due to the zero data chunk removal.

2. The method of claim 1, further comprising:
   initiating, by the system, the write operation to write chunks of data, comprising the chunk of data, to a file in the memory component, wherein the group of files comprises the file;
   determining, by the system, that the chunk of data contains the data bits having only the zero values based at least in part on analyzing the chunk of data;
   removing, by the system, the chunk of data from the write operation, in response to determining that the chunk of data contains the data bits having only the zero values; and
   converting, by the system, a storage region in the file in the memory component to the sparse region in metadata associated with the file, wherein the storage region is where the chunk of data was originally intended to be stored as part of the write operation, wherein the extent maps comprise an extent map that is part of the metadata, and wherein the zero extent is associated with the sparse region.

3. The method of claim 1, wherein the zero extent indicates that the sparse region was created due to the removing of the chunk of data based at least in part on the chunk of data being determined to contain the data bits having only the zero values.

4. The method of claim 3, wherein the write operation is a first write operation, wherein the chunk of data is a first chunk of data, wherein the sparse region is a first sparse region, wherein the zero extent is stored in a first extent map associated with a first file of the group of files, and wherein the method further comprises:
   during the first write operation or a second write operation, determining, by the system, that a second chunk of data being written to a second file contains a data bit having a non-zero value, wherein the group of files comprises the second file;
   determining, by the system, that, to facilitate data deduplication, the second chunk of data is to be removed from the first write operation or the second write operation, and is to be replaced with a second sparse region in metadata associated with the second file;
   in response to the determining that the second chunk of data contains the data bit having the non-zero value, and in response the determining that the second chunk of data is to be replaced with the second sparse region in the metadata, associating, by the system, a sparse extent with the second sparse region that represents the second chunk of data; and
   storing, by the system, the sparse extent in a second extent map associated with the second file, wherein the extent maps comprise the first extent map and the second extent map.

5. The method of claim 1, wherein the amount of the reduction of the use of the physical storage space in the memory component is a first amount, and wherein the method further comprises:
   determining, by the system, a data reduction ratio associated with the memory component based at least in part on the second number of zero extents, wherein the data reduction ratio indicates a second amount of logical data written to the memory component in relation to a third amount of the physical storage space of the memory component that is used to store data that is associated with the logical data, without including overhead information that comprises error correction information.

6. The method of claim 1, wherein the amount of the reduction of the use of the physical storage space in the memory component is a first amount, and wherein the method further comprises:
determining, by the system, a storage efficiency ratio associated with the memory component based at least in part on the second number of zero extents, wherein the storage efficiency ratio indicates a second amount of logical data written to the memory component in relation to a third amount of the physical storage space of the memory component that is used to store data that is associated with the logical data.

7. The method of claim 1, wherein the amount of the reduction of the use of the physical storage space in the memory component is a first amount, and wherein the method further comprises:
determining, by the system, a zero reduction ratio associated with the memory component based at least in part on the second number of zero extents, wherein the zero reduction ratio relates to the first amount of the reduction of the use of the physical storage space in the memory component due to the zero data chunk removal, and wherein the zero reduction ratio indicates a second amount of physical storage space in the memory component that is saved due to the zero data chunk removal in relation to a third amount of the physical storage space of the memory component that is used to store data that is associated with the logical data, without including overhead information that comprises error correction information.

8. The method of claim 1, wherein the chunk of data is a first chunk of data, wherein the write operation is a first write operation, wherein the sparse region is a first sparse region, wherein the zero extent is a first zero extent, and wherein the method further comprises:
in connection with a second write operation, in response to removing a second chunk of data, which is determined to contain the data bits having only the zero values, from the second write operation, determining, by the system, whether the first zero extent is associated with a storage location in the memory component where the second chunk of data was initially destined to be stored prior to the removal of the second chunk of data from the second write operation; and
one of:
in response to determining that the first zero extent is associated with the storage location, determining, by the system, that a second zero extent is not to be associated with the first sparse region, and determining, by the system, that the second number of zero extents is not to be incremented or decremented; or
in response to determining that there is no zero extent associated with the storage location, associating, by the system, the second zero extent with a second sparse region that represents the second chunk of data, wherein, in metadata, the second sparse region is associated with the storage location, and incrementing, by the system, a previous number of zero extents to the second number of zero extents.

9. The method of claim 1, wherein the group of files comprises a file, wherein the extent maps comprise an extent map associated with the file, wherein the zero extent is stored in the extent map, wherein metadata associated with the file comprises the sparse region and the extent map, and wherein the method further comprises:
in connection with a delete operation, deleting, by the system, the zero extent from the extent map and the sparse region from the metadata; and
decrementing, by the system, the second number of zero extents.

10. A system, comprising:
a memory that stores computer executable components; and
a processor that executes computer executable components stored in the memory, wherein the computer executable components comprise:
a write component that initiates execution of a write operation to write blocks of data to a memory component, wherein the blocks of data comprise a block of data; and
a data management component that, during the write operation, associates a zero extent with a sparse region that represents the block of data, in response to elimination of the block of data from the write operation due to the block of data being determined to comprise data bits having zero values,
wherein the data management component determines a first number of blocks of data that have been eliminated from write operations due to zero block elimination based at least in part on a second number of zero extents, comprising the zero extent, associated with a group of files stored in the memory component, to facilitate determining an amount of reduction of use of storage space in the memory component resulting from the zero block elimination.

11. The system of claim 10, wherein the computer executable components comprise a zero block eliminator that determines that the block of data contains the data bits having only the zero values based at least in part on an analysis of the block of data, and, in response to determining that the block of data contains the data bits having only the zero values, eliminates the block of data from the write operation,
wherein the data management component converts a storage region in a file in the memory component to the sparse region in metadata associated with the file, wherein the storage region is where the block of data was originally to be stored as part of the write operation, and wherein the zero extent is stored in an extent map included in the metadata.

12. The system of claim 10, wherein the zero extent indicates that the sparse region was created due to the elimination of the block of data from the write operation due to the block of data being determined to contain the data bits having only the zero values.

13. The system of claim 10, wherein the amount of the reduction of the use of the storage space in the memory component is a first amount, wherein the data management component determines a data reduction ratio associated with the memory component based at least in part on the second number of zero extents, and wherein the data reduction ratio indicates a second amount of logical data written to the memory component as compared to a third amount of the storage space of the memory component that is used to store data that corresponds to the logical data, without inclusion of overhead data.

14. The system of claim 10, wherein the amount of the reduction of the use of the storage space in the memory component is a first amount, wherein the data management component determines a storage efficiency ratio associated with the memory component based at least in part on the second number of zero extents, and wherein the storage efficiency ratio indicates a second amount of logical data written to the memory component as compared to a third amount of the storage space of the memory component that is used to store data that corresponds to the logical data.

15. The system of claim 10, wherein the amount of the reduction of the use of the storage space in the memory component is a first amount, wherein the data management component determines a zero reduction ratio associated with the memory component based at least in part on the second number of zero extents, wherein the zero reduction ratio relates to the first amount of the reduction of the use of the storage space in the memory component due to the zero block elimination, and wherein the zero reduction ratio indicates a second amount of storage space in the memory component that is saved due to the zero block elimination as compared to a third amount of the storage space of the memory component that is used to store data that corresponds to the logical data, without inclusion of overhead data.

16. The system of claim 10, wherein, in connection with the zero block elimination of the block of data, the data management component converts a storage region in a file in the memory component to the sparse region in metadata associated with the file, and determines whether any zero extent is already associated with the storage region, wherein the storage region is where the block of data was originally to be stored as part of the write operation, and
   wherein, in response to determining that there is no zero extent associated with the storage location, the data management component associates the zero extent with the sparse region, stores the zero extent in an extent map that is part of the metadata, and increments a previous number of zero extents to the second number of zero extents.

17. The system of claim 10, wherein the group of files comprises a file, wherein the zero extent is stored in an extent map associated with the file, wherein metadata associated with the file comprises the sparse region and the extent map, and
   wherein, in connection with a delete operation relating to the sparse region, the data management component deletes the zero extent from the extent map, deletes the sparse region from the metadata, and decrements the second number of zero extents.

18. A non-transitory machine-readable medium, comprising executable instructions that, when executed by a processor, facilitate performance of operations, comprising:
   during a write operation, in response to eliminating a chunk of data, which is determined to contain data bits having zero values, from the write operation, linking a zero reference with a sparse region that represents the chunk of data; and
   determining a first number of chunks of data that have been eliminated from write operations due to zero data chunk removal based at least in part on a second number of zero references, comprising the zero reference, associated with a set of files stored in a memory component, to facilitate determining an amount of reduction of use of storage space in the memory component due to the zero data chunk elimination, wherein the write operations comprise the write operation, and wherein the chunks of data comprise the chunk of data.

19. The non-transitory machine-readable medium of claim 18, wherein the zero reference indicates that the sparse region was created due to the eliminating of the chunk of data based at least in part on the chunk of data being determined to contain the data bits having only the zero values.

20. The non-transitory machine-readable medium of claim 18, wherein the operations further comprise:
   determining a data reduction ratio, a storage efficiency ratio, or a zero reduction ratio associated with the memory component as a function of the second number of zero references.

* * * * *